US008390223B2

(12) United States Patent
Nakamura et al.

(10) Patent No.: US 8,390,223 B2
(45) Date of Patent: Mar. 5, 2013

(54) CONTROL DEVICE FOR ELECTRIC MOTOR DRIVE DEVICE

(75) Inventors: Mitsuru Nakamura, Anjo (JP); Arinori Shimada, Anjo (JP); Subrata Saha, Anjo (JP); Ken Iwatsuki, Anjo (JP); Zhiqian Chen, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 275 days.

(21) Appl. No.: 12/855,220

(22) Filed: Aug. 12, 2010

(65) Prior Publication Data

US 2011/0074320 A1 Mar. 31, 2011

(30) Foreign Application Priority Data

Sep. 30, 2009 (JP) ................................ 2009-228857

(51) Int. Cl.
*H02P 27/04* (2006.01)
*H02P 21/00* (2006.01)
(52) U.S. Cl. .............. 318/400.01; 318/400.02; 318/432; 363/41; 363/71
(58) Field of Classification Search ............ 318/400.01, 318/400.02, 400.24, 400.23, 400.14, 400.15, 318/432, 599; 363/41, 45, 34, 74, 132; 324/207.25, 324/207.11; 323/217, 219, 212, 223, 265, 323/311, 349
See application file for complete search history.

(56) References Cited

U.S. PATENT DOCUMENTS

| 5,883,484 | A   | * | 3/1999 | Akao ........................... 318/700 |
| 7,781,999 | B2  | * | 8/2010 | Amano ...................... 318/400.3 |
| 7,986,116 | B2  | * | 7/2011 | Imura et al. ............. 318/400.15 |
| 2009/0115362 | A1 |   | 5/2009 | Saha et al. |
| 2009/0195197 | A1 | * | 8/2009 | Nishimura et al. ....... 318/400.09 |
| 2010/0072925 | A1 | * | 3/2010 | Itoh et al. ................. 318/400.02 |
| 2010/0140003 | A1 | * | 6/2010 | Saha et al. ............... 180/65.285 |

FOREIGN PATENT DOCUMENTS

| JP | A-2002-272184 | 9/2002 |
| JP | B2-3890907 | 3/2007 |
| JP | A-2009-118544 | 5/2009 |
| JP | A-2009-183092 | 8/2009 |

OTHER PUBLICATIONS

International Search Report issued in International Application No. PCT/JP2010/064607 mailed on Oct. 26, 2010 (w/English Translation).

* cited by examiner

*Primary Examiner* — Eduardo Colon Santana
(74) *Attorney, Agent, or Firm* — Oliff & Berridge, PLC

(57) ABSTRACT

A control device that controls an electric motor drive device. The control device is configured with a first voltage control section that derives a modulation rate representing a ratio of an effective value of the voltage command values to the DC voltage and a voltage command phase. A second voltage control section generates a control signal for controlling the DC/AC conversion section on the basis of the modulation rate, the voltage command phase, and a magnetic pole position representing a rotational angle of a rotator of the AC electric motor. A computation cycle of the first voltage control section is set to be longer than a computation cycle of the second voltage control section.

9 Claims, 8 Drawing Sheets

CONTROL DEVICE FOR ELECTRIC MOTOR DRIVE DEVICE

INCORPORATION BY REFERENCE

The disclosure of Japanese Patent Application No. 2009-228857 filed on Sep. 30, 2009 including the specification, drawings and abstract is incorporated herein by reference in its entirety

BACKGROUND OF THE INVENTION

1. Field of the Invention

The present invention relates to a control device that controls an electric motor drive device, which includes a DC/AC conversion section that converts a DC voltage into an AC voltage to supply the AC voltage to an AC electric motor, using a vector control method.

2. Description of the Related Art

An electric motor drive device that converts a DC voltage from a DC power source into an AC voltage through an inverter serving as a DC/AC conversion section to drive an AC electric motor is generally used. Such an electric motor drive device may perform vector control (field oriented control: FOC) to supply a sinusoidal AC voltage to coils of the AC electric motor for respective phases in order to efficiently produce a torque. In such vector control, respective currents flowing through the stator coils of the AC electric motor for three phases are subjected to coordinate conversion into two vector components in a d-axis, which is the direction of the magnetic field produced by a permanent magnet disposed in a rotor, and a q-axis, which is perpendicular to the d-axis, to perform feedback control.

Japanese Patent Publication No. JP-B-3890907 discloses a control device for an electric motor drive device configured to perform vector control for two AC electric motors by commonly using a single computation processing unit. In the control device according to Japanese Patent Publication No. JP-B-3890907, first, a current control section derives voltage command values vd'* and vq'* on the basis of current command values id* and iq* which are command values of currents for driving the AC electric motor and actual currents id and iq flowing through the AC electric motor. Next, non-interference computation is performed to derive two-phase voltage command values vd* and vq*, in which interference terms have been corrected, on the basis of the derived voltage command values vd'* and vq'*. Thereafter, a voltage control section derives three-phase voltage command values vu*, vv*, and vw* on the basis of the two-phase voltage command values vd* and vq* and a magnetic pole position qre which represents the rotational position of the rotor of the AC electric motor, and generates a control signal for controlling the inverter in accordance with the three-phase voltage command values vu*, vv*, and vw*.

In order to more precisely control the output torque and the rotational speed of the AC electric motor when driving the AC electric motor as described above, it is preferable to perform feedback control by acquiring the respective command values and actual values in as short a cycle as possible. However, performing a large amount of computation in each short cycle increases the processing load to be incurred by the computation processing unit. While the use of an additional computation processing unit or a higher-performance computation processing unit is also conceivable, such use is not preferable in terms of reducing the size and the cost of the electric motor drive device and the control device for the electric motor drive device.

In this respect, in the control device according to Japanese Patent Publication No. JP-B-3890907, a computation cycle (hereinafter occasionally referred to as a current control cycle) in which the current control section derives the voltage command values vd'* and vq'* and further derives the two-phase voltage command values vd* and vq* on the basis of the derived voltage command values vd'* and vq'* is set to be longer (specifically, twice or n times (where n is an integer)) than a computation cycle (hereinafter occasionally referred to as a voltage control cycle) in which the voltage control section derives the three-phase voltage command values vu*, vv*, and vw* and further generates the control signal for controlling the inverter on the basis of the derived three-phase voltage command values vu*, vv*, and vw*. The processing load on the computation processing unit is thus reduced by reducing the frequency of derivations of the voltage command values vd'* and vq'* and the two-phase voltage command values vd* and vq*. In the control device according to Japanese Patent Publication No. JP-B-3890907, in addition, the respective voltage command values vd'* (vd*) and vq'* (vq*) for the two AC electric motors for the next cycle are derived alternately in each current control cycle, and the control signal for controlling the inverter is output in each voltage control cycle while considering a delay time from the timing at which the magnetic pole position is taken in each of the AC electric motors. This makes it possible to obtain an output with as high resolution as possible while reducing the processing load on the computation processing unit.

SUMMARY OF THE INVENTION

While Japanese Patent Publication No. JP-B-3890907 does not specifically disclose a method for deriving the three-phase voltage command values vu*, vv*, and vw* on the basis of the two-phase voltage command values vd* and vq* and the magnetic pole position qre, it is considered to be common to derive the three-phase voltage command values vu*, vv*, and vw* using a predetermined computation formula or using a predetermined map stored in advance. In the former case, the computation formula itself may be extremely complicated, and therefore the processing load for the computation may be very high. In the latter case, a three-dimensional map based on three parameters (vd*, vq*, and qre) is used as the predetermined map, and therefore the processing load for deriving the three-phase voltage command values vu*, vv*, and vw* using the map may be relatively high, though not so high as the former case.

In either of the above cases, the current control cycle is set to be longer than the voltage control cycle, and thus the two-phase voltage command values vd* and vq* are occasionally not varied after completion of one voltage control cycle. In this case, the two-phase voltage command values vd* and vq* with the same value as those in the preceding cycle are used again to derive the three-phase voltage command values vu*, vv*, and vw* and to generate the control signal. That is, the computation process performed by the control device according to Japanese Patent Publication No. JP-B-3890907 is partially redundant, which makes the processing load by the voltage control section unnecessarily high. Thus, there has been room for improvement in optimizing the computation cycles of internal processes performed by the voltage control section.

Thus, it is desired to realize a control device in which the computation cycles of internal processes performed by a voltage control section are optimized and the processing load for controlling an AC electric motor is reduced.

The present invention provides a control device that controls an electric motor drive device, which includes a DC/AC conversion section that converts a DC voltage into an AC voltage to supply the AC voltage to an AC electric motor, using a vector control method. The control device includes, as a voltage control section that generates a control signal for controlling the DC/AC conversion section from voltage command values which are command values of voltages for two phases for driving the AC electric motor, a first voltage control section that derives a modulation rate representing a ratio of an effective value of the voltage command values to the DC voltage and a voltage command phase which is a phase angle between voltage vectors represented by the voltage command values on the basis of the voltage command values and the actual DC voltage supplied to the DC/AC conversion section, and a second voltage control section that generates the control signal on the basis of the modulation rate, the voltage command phase, and a magnetic pole position representing a rotational angle of a rotator of the AC electric motor. In the control device, a computation cycle of the first voltage control section is set to be longer than a computation cycle of the second voltage control section.

According to the above characteristic configuration, a sequence of computation processes in which the control signal for controlling the DC/AC conversion section is generated on the basis of the voltage command values and the magnetic pole position, which has been performed in one computation cycle in the related art, is divided into a computation process (hereinafter occasionally referred to as a first voltage control process) in which the modulation rate and the voltage command phase are derived on the basis of the voltage command values and the actual DC voltage, and a computation process (hereinafter occasionally referred to as a second voltage control process) in which the control signal for controlling the DC/AC conversion section is generated on the basis of the modulation rate, the voltage command phase, and the magnetic pole position. The second voltage control process performed by the second voltage control section is preferably performed with as high a resolution as possible in accordance with the actual magnetic pole position of the AC electric motor. From this viewpoint, the second voltage control process is preferably performed in as short a cycle as possible. Meanwhile, it is not necessary for the first voltage control section to perform the first voltage control process in a computation cycle that is shorter than the computation cycle in which the voltage command values are derived, and therefore the computation cycle in which the voltage command values are derives is often set to be longer than the computation cycle in which the control signal is generated. In consideration of such a fact, the computation cycle of the first voltage control process is set to be longer than the computation cycle of the second voltage control process. Hence, the processing load can be reduced easily by avoiding unnecessary computation processing in the case where the voltage command values are not varied from those in the preceding cycle. As a result, it is easy to reduce the entire processing load of the sequence of computation processes in which the control signal for controlling the DC/AC conversion section is generated on the basis of the voltage command values and the magnetic pole position.

According to the above characteristic configuration, also, the second voltage control process performed by the second voltage control section is performed on the basis of the modulation rate, the voltage command phase, and the magnetic pole position. Here, the voltage command phase and the magnetic pole position are parameters of the same dimension related to the phase of a reference waveform for generating the control signal. Thus, in the case where the second voltage control process is performed using a predetermined computation formula, the computation formula can be made relatively simple. Also, in the case where the second voltage control process is performed using a predetermined map, a two-dimensional map based on two parameters (modulation rate and phase) may be used as the map. Hence, in either case, the processing load of the second voltage control process can be reduced.

Moreover, also in the first voltage control process performed by the first voltage control section, the modulation rate and the voltage command phase can be derived easily on the basis of the voltage command values and the DC voltage using a predetermined computation formula or map. Hence, the processing load of the first voltage control process can be reduced. As a result, also from this point, it is possible to reduce the entire processing load of the sequence of computation processes in which the control signal is generated.

Thus, according to the above characteristic configuration, it is possible to provide a control device in which the computation cycles of internal processes performed by a voltage control section are optimized and the processing load for controlling an AC electric motor is reduced.

The control device may further include a current control section that derives the voltage command values on the basis of current command values which are command values of currents for two phases for driving the AC electric motor, actual currents flowing through the AC electric motor, and a rotational speed of the rotator, and the computation cycle of the first voltage control section is set to be equal to a computation cycle of the current control section.

In the case where the computation cycle in which the first voltage control section derives the modulation rate and the voltage command phase is shorter than the computation cycle in which the current control section derives the voltage command values, unnecessary computation processing may be performed by deriving the modulation rate and the voltage command phase even in the case where the voltage command values are not varied from those in the preceding cycle. On the other hand, in the case where the computation cycle in which the first voltage control section derives the modulation rate and the voltage command phase is longer than the computation cycle in which the current control section derives the voltage command values, the modulation rate and the voltage command phase may not be derived with high precision appropriately in accordance with variations in voltage command values. According to the above configuration, the modulation rate and the voltage command phase can be derived appropriately in an optimum computation cycle in accordance with the computation cycle in which the voltage command values are derived.

The computation cycle of the current control section and the first voltage control section may be set to N times the computation cycle of the second voltage control section (N is an integer of 2 or more).

According to the configuration, the relationship between the respective control cycles of the current control section, the first voltage control section, and the second voltage control section is maintained appropriately, which makes it easy to both reduce the processing load for controlling the AC electric motor and ensure control response.

The control device may further include a mode determination section that determines one of a plurality of control modes set in advance to control the electric motor drive device on the basis of a predetermined mode determination input variable, the second voltage control section generates the control signal in accordance with the control mode determined by the mode determination section, and an update cycle of the mode determination input variable is set to be longer than the computation cycle of the first voltage control section, and a computation cycle of the mode determination section is set to be equal to the update cycle of the mode determination input variable.

The computation for determining the control mode is less urgent than the second voltage control process for generating the control signal for controlling the DC/AC conversion section and the first voltage control process for deriving the modulation rate and the voltage command phase on the basis of which the second voltage control process is performed. Hence, a problem hardly occurs even if the priority of the process for determining the control mode is made lower than that of the first voltage control process or the second voltage control process.

Thus, as in the above configuration, the computation cycle of the computation process for determining the control mode, which is less urgent, may be set to be longer than the computation cycle of the first voltage control process, which is the longer one of the respective computation cycles of the first voltage control process and the second voltage control process, so as to match the update cycle of the mode determination input variable. Thus, the processing load for controlling the AC electric motor can be reduced by appropriately reducing the number of times to perform the process for determining the control mode.

The mode determination input variable may include at least the target torque of the AC electric motor and the rotational speed of the rotator. According to the configuration, the control mode can be determined simply and appropriately utilizing information on the target torque and the rotational speed of the rotator which is directly relevant to the derivation of the voltage command values.

The control device may further include a carrier frequency determination section that determines a carrier frequency of the DC/AC conversion section on the basis of a predetermined carrier frequency determination input variable, an update cycle of the carrier frequency determination input variable is set to be longer than the computation cycle of the first voltage control section, and a computation cycle of the carrier frequency determination section is set to be equal to the update cycle of the carrier frequency input variable.

The computation for determining the carrier frequency is less urgent than the second voltage control process for generating the control signal for controlling the DC/AC conversion section and the first voltage control process for deriving the modulation rate and the voltage command phase on the basis of which the second voltage control process is performed. Hence, a problem hardly occurs even if the priority of the process for determining the carrier frequency is made lower than that of the first voltage control process or the second voltage control process.

Thus, as in the above configuration, the computation cycle of the computation process for determining the carrier frequency, which is less urgent, may be set to be longer than the computation cycle of the first voltage control process, which is the longer one of the respective computation cycles of the first voltage control process and the second voltage control process in accordance with the update cycle of the carrier frequency determination input variable. Thus, the processing load for controlling the AC electric motor can be reduced by appropriately reducing the number of times to perform the process for determining the carrier frequency.

The carrier frequency determination input variable may include at least the modulation rate and the rotational speed of the rotator. According to the configuration, the carrier frequency can be determined simply and appropriately utilizing information on the modulation rate and the rotational speed of the rotator which is directly or indirectly relevant to the derivation of the voltage command values.

In the control device for an electric motor drive device which has been described so far, the computation cycle of the first voltage control section may be set to N times the computation cycle of the second voltage control section is an integer of 2 or more), and the electric motor drive device may be configured to control N AC electric motors and to be controlled using a single computation processing unit, the second voltage control section may complete a generation process for generating the control signal corresponding to each of the AC electric motors in each reference computation cycle set to a predetermined time, and the first voltage control section may complete a derivation process for deriving the modulation rate and the voltage command phase for one of the N AC electric motors once in N reference computation cycles, and complete the derivation process for the others of the AC electric motors once in the N reference computation cycles while the derivation process for the one of the AC electric motors is not executed.

According to the configuration, the control signal corresponding to each of the AC electric motors is generated in each reference computation cycle. Thus, each of the plurality of AC electric motors can be driven smoothly. The modulation rate and the voltage command phase are derived sequentially for the plurality of AC electric motors once each in the plurality of reference computation cycles. Thus, the derivation process for each of the AC electric motors can be performed appropriately while reducing the processing load. Thus, the plurality of AC electric motors can be controlled appropriately in an optimum computation cycle using the single computation processing unit.

DETAILED DESCRIPTION OF THE EMBODIMENTS

1. First Embodiment

Figure 1:
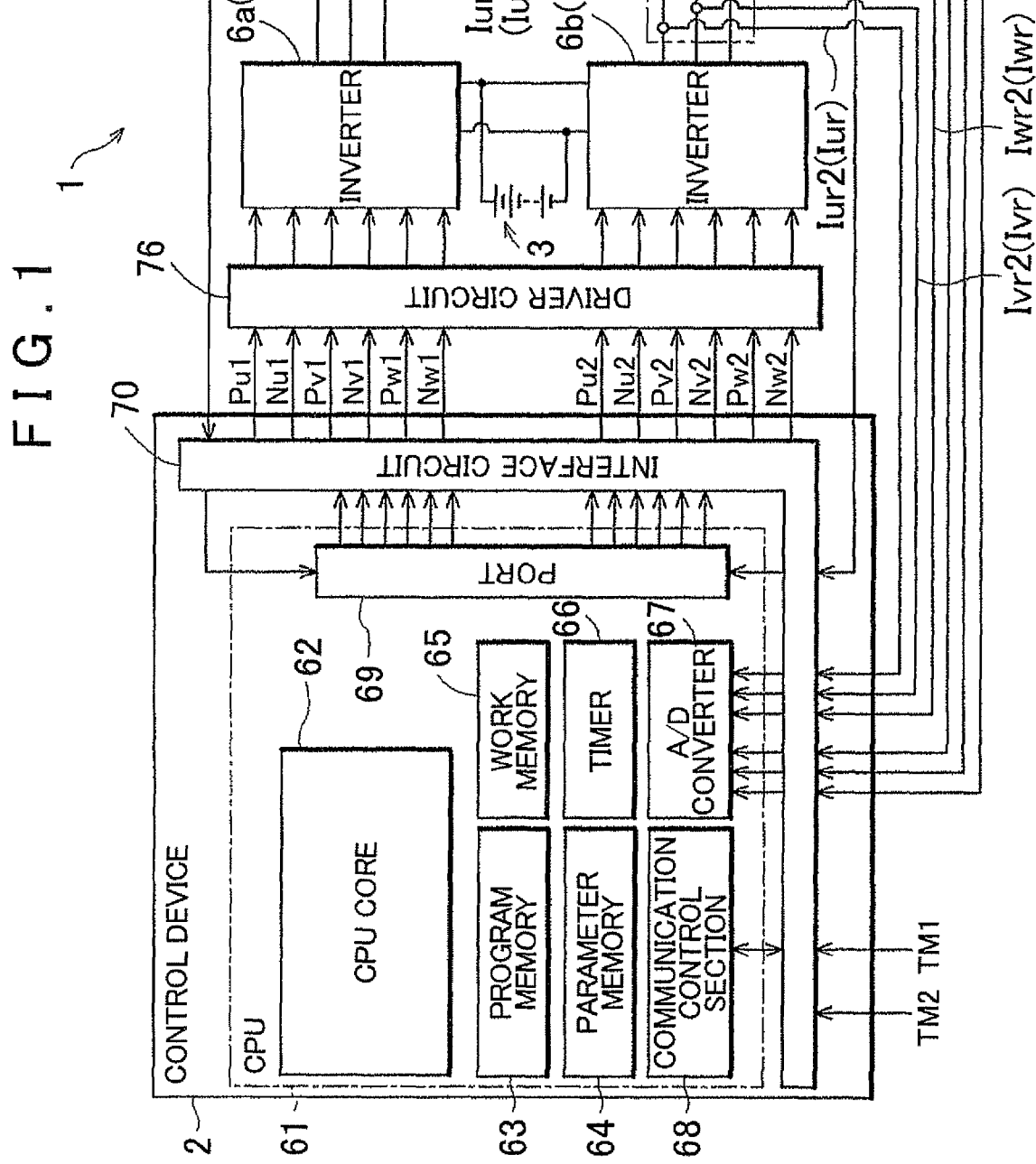
FIG. 1 is a block diagram schematically showing an exemplary system configuration for a vehicle including a control device according to a first embodiment.
Figure 2:
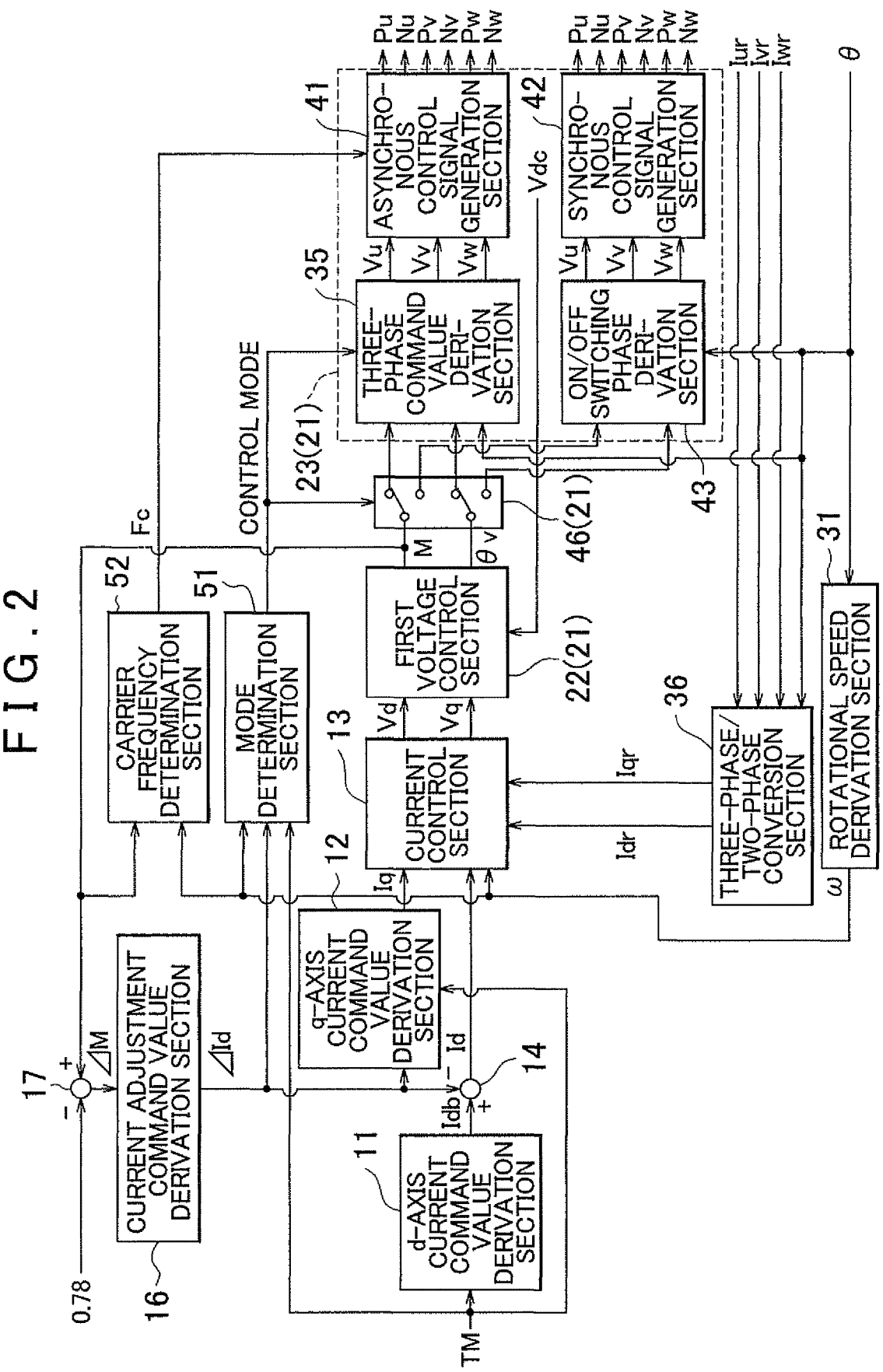
FIG. 2 is a functional block diagram of the control device according to the first embodiment.

A control device 2 for an electric motor drive device 1 according to a first embodiment of the present invention will be described with reference to the drawings. In the embodiment, as shown in FIG. 1, the electric motor drive device 1 is configured as a device that controls driving of two interior permanent magnet synchronous electric motors MG1 and MG2 (IPMSMs, hereinafter occasionally collectively referred to simply as "electric motors MG") which are each an AC electric motor that operates on three-phase AC. The electric motors MG are each configured to operate also as a generator as necessary. The electric motors MG are each used as a drive power source for electric vehicles, hybrid vehicles, or the like, for example. The electric motor drive device 1 includes inverters 6 that convert a DC voltage Vdc into an AC voltage to supply the AC voltage to the electric motors MG In the embodiment, in addition, as shown in FIG. 2, the control device 2 controls the electric motor drive device 1 using a vector control method.

Figure 7:
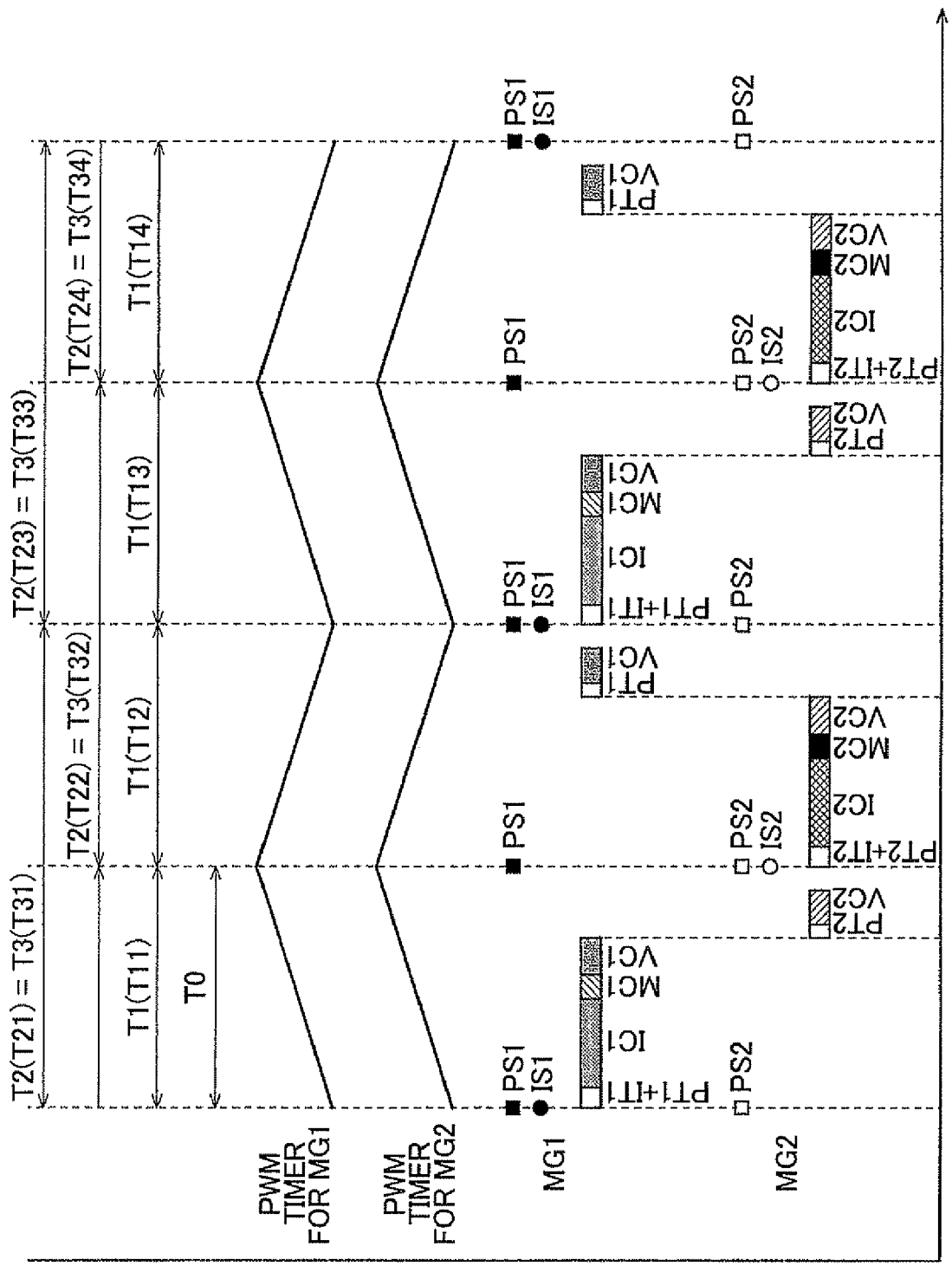
FIG. 7 is a time chart of a case where the electric motor control process according to the first embodiment is performed.

In such a configuration, the control device 2 according to the embodiment includes, as a voltage control section 21 that generates switching control signals Pu, Nu, Pv, Nv, Pw, and Nw for controlling the inverters 6 from voltage command values Vd and Vq for driving the electric motors MG: a first voltage control section 22 that derives a modulation rate M and a voltage command phase qv on the basis of the voltage command values Vd and Vq and a DC voltage Vdc; and a second voltage control section 23 that generates the switching control signals Pu, Nu, Pv, Nv, Pw, and Nw on the basis of the modulation rate M, the voltage command phase qv, and a magnetic pole position q, and a computation cycle (second computation cycle T2) of the first voltage control section 22 is set to be longer than a computation cycle (first computation cycle T1) of the second voltage control section 23 (see FIG. 7). This makes it possible to realize the control device 2 in which the computation cycles of internal processes performed by the voltage control section 21 are optimized and the processing load for controlling the electric motors MG is reduced. The electric motor drive device 1 and the control device 2 for the electric motor drive device 1 according to the embodiment will be described in detail below.

1-1. Hardware Configuration of Electric Motor Drive Device and Control Device First, the hardware configuration of the electric motor drive device 1 and the control device 2 according to the embodiment will be described with reference to FIG. 1. In the embodiment, as shown in FIG. 1, two three-phase synchronous electric motors MG1 and MG2 are provided to be controlled. The electric motors MG1 and MG2 may have the same performance as or difference performances from each other. The electric motors MG1 and MG2 are connected to a DC power source 3 that produces the DC voltage Vdc via the respective inverters 6a and 6b (hereinafter occasionally collectively referred to simply as "inverters 6"). As the DC power source 3, various types of secondary batteries such as nickel-hydrogen secondary batteries and lithium-ion secondary batteries, capacitors, or a combination thereof, for example, may be used. The DC voltage Vdc produced by the DC power source 3 is detected by a voltage sensor (not shown) and output to the control device 2. A smoothing condenser that smoothes the DC voltage Vdc from the DC power source 3, a converter that boosts the DC voltage Vdc from the DC power source 3, and/or the like may be suitably provided between the DC power source 3 and the inverters 6.

The inverter 6 converts the DC voltage Vdc from the DC power source 3 into a three-phase AC voltage to supply the three-phase AC voltage to the electric motor MG. The thus supplied three-phase AC voltage drives the electric motor MG That is, the inverter 6 functions as the "DC/AC conversion section". The inverter 6 includes a plurality of switching elements (not shown). As the switching elements, IGBTs (insulated gate bipolar transistors), MOSFETs (metal oxide semiconductor field effect transistors), or the like, for example, are suitably used. In the following description, IGBTs are used as the switching elements.

The inverter 6 (6a, 6b) is formed by a three-phase bridge circuit. Two IGBTs are connected in series between the input plus side and the input minus side of the inverter 6, and three such series circuits are connected in parallel. That is, the three series circuits of the bridge circuit respectively correspond to stator coils Mu (Mu1, Mu2), My (Mv1, Mv2), and Mw (Mw1, Mw2) of the electric motor MG (MG1, MG2) which respectively correspond to u-phase, v-phase, and w-phase. The collector of an IGBT in the upper stage for each phase is connected to the input plus side of the inverter 6, and the emitter of the IGBT is connected to the collector of an IGBT in the lower stage for the corresponding phase. The emitter of the IGBT in the lower stage for each phase is connected to the input minus side of the inverter 6 (for example, the ground). The middle points of the series circuits, each formed by a pair of IGBTs, for the respective phases, that is, the connection points of the IGBTs, are respectively connected to the stator coils Mu, My, and Mw of the electric motor MG.

A freewheel diode (regeneration diode) is connected in parallel to each IGBT. The freewheel diode is connected in parallel to each IGBT with its cathode terminal connected to the collector terminal of the IGBT and its anode terminal connected to the emitter terminal of the IGBT. The gate of each IGBT is connected to the control device 2 via a driver circuit 76 to be individually subjected to switching control.

The control device 2 controls a plurality (here, two) of the inverters 6 (6a and 6b) provided in the electric motor drive device 1. The control device 2 is formed as an ECU (electronic control unit) formed by a logic circuit such as a microcomputer as its core component. In the embodiment, the control device 2 includes a CPU (central processing unit) 61 which is a single-tasking microcomputer, an interface circuit 70, and other peripheral circuits. The CPU 61 is a computer that executes a electric motor control process to be discussed later. The interface circuit 70 is formed by an EMI (electromagnetic interference)-proof component, a buffer circuit, etc. The switching control signals which are drive signals to be input to the gate of an IGBT or an MOSFET serving as a switching element that switches a high voltage require a voltage that is higher than the drive voltage of a general electronic circuit such as a microcomputer. Therefore, the switching control signals are boosted via the driver circuit 76, and then are input to the inverters 6.

The CPU 61 includes at least a CPU core 62, a program memory 63, a parameter memory 64, a work memory 65, a timer 66, an A/D converter 67, a communication control section 68, and a port 69. The CPU core 62 is a core component of the CPU 61, and includes an instruction register, an instruction decoder, an ALU (arithmetic logic unit) that principally executes various computations, a flag register, a multi-purpose register, and an interrupt controller. In the embodiment, the CPU 61 includes the single CPU core 62. The single CPU core 62 corresponds to the single computation processing unit according to the present invention. The CPU core 62 serves as a core component of the single-tasking computer that executes programs in series.

The program memory 63 is a nonvolatile memory that stores an electric motor control program. The parameter memory 64 is a nonvolatile memory that stores various parameters to be referenced during execution of the program.

The parameter memory 64 may be constructed integrally with the program memory 63. The program memory 63 and the parameter memory 64 are suitably formed by a flash memory or the like, for example. The work memory 65 is a memory that temporarily stores temporary data generated during execution of the program. The work memory 65 may be a volatile memory, and may be formed by a DRAM (dynamic RAM) or an SRAM (static RAM) that enables high-speed reading and writing of data.

The timer 66 counts the time using the clock cycle of the CPU 61 as the minimum resolution. For example, the timer 66 monitors the execution cycle of the program to inform the interrupt controller of the CPU core 62 of the monitoring results. The A/D converter 67 converts an analog electrical signal into digital data. In the embodiment, the A/D converter 67 receives current detection values Iur (Iur1 and Iur2), Ivr (Ivr1 and Ivr2), and Iwr (Iwr1 and Iwr2), which are values obtained by detecting respective currents flowing through the stator coils Mu, Mv, and Mw of the electric motors MG, from current sensors 7 (7a and 7b) to convert the received current detection values into digital values. Because the three phases, namely u-phase, v-phase, and w-phase, are in equilibrium so that the instantaneous value of the sum of currents for the three phases is zero, it is also possible to detect currents for only two phases and obtain a current for the remaining phase in the CPU 61 through computation. In the embodiment, currents for all the three phases are detected. In the case where currents for only two phases are detected and a current for the remaining phase is obtained through computation, it is sufficient that the A/D converter 67 should include four analog inputs.

The communication control section 68 controls communication with other systems in the vehicle. In the embodiment, the communication control section 68 controls communication with a running control system, sensors, and so forth via a CAN (controller area network, not shown) in the vehicle. For example, the CPU 61 receives an electric motor control command including target torques TM of the electric motors MG from the running control system via the communication control section 68 to control the electric motors MG on the basis of the target torques TM. In the embodiment, the CPU 61 respectively receives a target torque TM1 of a first electric motor MG1 and a target torque TM2 of a second electric motor MG2 (hereinafter occasionally collectively referred to simply as "target torques TM"). Also, the CPU 61 may be connected to a brake system, a power steering system, and/or the like via the communication control section 68 to suitably control such systems.

The port 69 is a terminal control section that outputs the switching control signals for the inverters 6 and so forth via terminals of the CPU 61 and that receives rotation detection signals input from rotation detection sensors 8 (8a and 8b) to the CPU 61. Regarding signals input from the interface circuit 70 to the driver circuit 76 shown in FIG. 1, reference symbol P* denote control signals for IGBTs in the upper stage of the inverters 6, and reference symbol N* denote control signals for IGBTs in the lower stage of the inverters 6. Reference symbols *u, *v, and *w respectively denote control signals for IGBTs for u-phase, v-phase, and w-phase of the inverters 6. Reference symbols *1 and *2 respectively denote IGBT control signals as switching control signals for the inverter 6a for the first electric motor MG1 and for the inverter 6b for the second electric motor MG2. The rotation sensors 8 are respectively installed in the vicinity of the electric motors MG to detect the magnetic pole position q representing the rotational angle of the rotor serving as the rotator of the electric motors MG. The rotation sensors 8 are each formed using a resolver, for example. The magnetic pole position q is represented as an electrical angle representing the rotational angle of the rotor.

Thus, in the embodiment, the electric motor drive device 1 includes the two electric motors MG1 and MG2 to be controlled and the two inverters 6a and 6b respectively corresponding to the two electric motors MG1 and MG2. The control device 2 is configured to control the two electric motors MG1 and MG2 by controlling the two inverters 6a and 6b. The control device 2 is configured to control the two inverters 6a and 6b using the CPU core 62 serving as the single computation processing unit.

1-2. Software Configuration of Control Device

Next, the software configuration of the control device 2 will be described. In the embodiment, in order to support the electric motor drive device 1 including the two motors MG1 and MG2 to be controlled and the two inverters 6a and 6b respectively corresponding to the two electric motors MG1 and MG2, the control device 2 includes functional sections respectively corresponding to the two inverters 6a and 6b and the two electric motors MG1 and MG2. The configurations of the respective functional sections are the same as each other, and therefore only one of the functional sections that controls one of the inverters 6 and one of the electric motors MG will be described below. As shown in FIG. 2, the control device 2 controls the electric motor drive device 1 including the electric motors MG and the inverters 6 through current feedback control using a vector control method. In the vector control, respective coil currents flowing through stator coils of the AC electric motor MG for three phases are subjected to coordinate conversion into vector components for two phases, namely a d-axis, which is the direction of the magnetic field produced by the permanent magnet disposed in the rotor, and a q-axis, which is perpendicular to the d-axis, to perform current feedback control.

In the coordinate conversion performed in the vector control, it is necessary to detect the rotational state of the electric motor MG at all times. Thus, as shown in FIG. 1, the rotation detection sensor 8 such as a resolver is provided in the vicinity of the electric motor MG. The control device 2 receives the magnetic pole position q detected by the rotation sensor 8 as an input. As described above, the magnetic pole position q is represented as an electrical angle. The control device 2 further receives the target torque TM as an input. The control device 2 then generates the switching control signals Pu, Nu, Pv, Nv, Pw, and Nw for driving the electric motor MG in accordance with the target torque TM, the magnetic pole position q, and a rotational speed w of the electric motor MG derived from the magnetic pole position q, and outputs the generated switching control signals to control driving of the inverter 6. The switching control signals Pu, Nu, Pv, Nv, Pw, and Nw are control signals for causing the respective switching elements of the inverter 6 to perform switching operation in accordance with any of a plurality of control modes to be discussed later, and are specifically gate drive signals that drive the respective gates of the switching elements.

A d-axis current command value derivation section 11 receives the target torque TM as an input. The d-axis current command value derivation section 11 derives a fundamental d-axis current command value Idb on the basis of the input target torque TM. The fundamental d-axis current command value Idb corresponds to a command value of the d-axis current in maximum torque control. In the maximum torque control, the current phase is adjusted such that the output torque of the electric motor MG becomes maximum for the same current. In the embodiment, the d-axis current command value derivation section 11 is configured to derive the fundamental d-axis current command value Idb in accordance with the value of the target torque TM using a table defining the relationship between the value of the target torque TM and the fundamental d-axis current command value. The derived fundamental d-axis current command value Idb is input to a subtractor 14. The subtractor 14 further receives a d-axis current adjustment command value DId, which is derived by a current adjustment command value derivation section 16 to be discussed later, as an input. The subtractor 14 subtracts the d-axis current adjustment command value DId from the fundamental d-axis current command value Idb to derive a final d-axis current command value Id as indicated by Formula (1) below:

$$Id = Idb - Did \qquad (1)$$

A q-axis current command value derivation section 12 receives the target torque TM and the d-axis current adjustment command value DId as inputs. The q-axis current command value derivation section 12 derives a q-axis current command value Iq on the basis of the input target torque TM and d-axis current adjustment command value DId. In the embodiment, the q-axis current command value derivation section 12 at least derives the q-axis current command value Iq in accordance with the target torque TM and the d-axis current adjustment command value DId using a table defining the relationship between the value of the target torque TM and the d-axis current adjustment command value DId. The thus derived d-axis current command value Id and q-axis current command value Iq are command values of currents for two phases having vector components that are orthogonal to each other for driving the electric motor MG. Thus, in the embodiment, the d-axis current command value Id and the q-axis current command value Iq correspond to the "current command value" according to the present invention.

A current control section 13 receives the d-axis current command value Id and the q-axis current command value Iq as inputs. The current control section 13 further receives a d-axis current detection value Idr and a q-axis current detection value Iqr from a three-phase/two-phase conversion section 36 as inputs, and receives the rotational speed w of the electric motor MG from a rotational speed derivation section 31 as an input. The d-axis current detection value Idr and the q-axis current detection value Iqr are derived through three-phase/two-phase conversion performed by the three-phase/two-phase conversion section 36 on the basis of the current detection values (current detection values for three phases: the u-phase current detection value Iur, the v-phase current detection value Ivr, and the w-phase current detection value Iwr) obtained by the current sensor 7 (see FIG. 1) by detecting respective currents actually flowing through the stator coils (Mu, Mv, and Mw) of the electric motor MG, and the magnetic pole position q detected by the rotation sensor 8 (see FIG. 1). The rotational speed w of the electric motor MG is derived by the rotational speed derivation section 31 on the basis of the magnetic pole position q detected by the rotation sensor 8 (see FIG. 1).

The current control section 13 performs current control computation in which the voltage command values Vd and Vq are derived on the basis of the d-axis current command value Id and the q-axis current command value Iq which are current command values for two phases, the current detection values for two phases (the d-axis current detection value Idr and the q-axis current detection value Iqr) obtained by performing three-phase/two-phase conversion on the current detection values Iur, Ivr, and Iwr, and the rotational speed w of the rotor of the electric motor MG. In this event, the current control section 13 determines the voltage command values Vd and Vq for two phases by performing at least proportional control and integral control on the basis of a deviation. Specifically, the current control section 13 derives a d-axis current deviation dId, which is the deviation between the d-axis current command value Id and the d-axis current detection value Idr, and a q-axis current deviation dIq, which is the deviation between the q-axis current command value Iq and the q-axis current detection value Iqr. The current control section 13 then performs proportional-integral control computation (PI control computation) on the basis of the d-axis current deviation dId to derive a d-axis voltage drop Vzd which is a d-axis component of a voltage drop, and performs proportional-integral control computation on the basis of the q-axis current deviation dIq to derive a q-axis voltage drop Vzq which is a q-axis component of the voltage drop.

The current control section 13 then subtracts a q-axis armature reaction Eq from the d-axis voltage drop Vzd to derive a d-axis voltage command value Vd as indicated by Formula (2) below:

$$\begin{aligned} Vd &= Vzd - Eq \\ &= Vzd - w \cdot Lq \cdot Iqr \end{aligned} \qquad (2)$$

As indicated by Formula (2), the q-axis armature reaction Eq is derived on the basis of the rotational speed w of the electric motor MG, the q-axis current detection value Iqr, and a q-axis inductance Lq.

The current control section 13 further adds a d-axis armature reaction Ed and an induced voltage Em due to armature flux linkage of the permanent magnet to the q-axis voltage drop Vzq to derive a q-axis voltage command value Vq as indicated by Formula (3) below:

$$\begin{aligned} Vq &= Vzq + Ed + Em \\ &= Vzq + w \cdot Ld \cdot Idr + w \cdot MIf \end{aligned} \qquad (3)$$

As indicated by Formula (3), the d-axis armature reaction Ed is derived on the basis of the rotational speed w of the electric motor MG, the d-axis current detection value Idr, and a d-axis inductance Ld. Also, the induced voltage Em is derived on the basis of an induced voltage constant MIf, which is determined in accordance with the effective value of the armature flux linkage of the permanent magnet, and the rotational speed w of the electric motor MG.

The thus derived d-axis voltage command value Vd and q-axis voltage command value Vq are command values of voltages for two phases having vector components that are orthogonal to each other for driving the electric motor MG. Thus, in the embodiment, the d-axis voltage command value Vd and the q-axis voltage command value Vq correspond to the "voltage command value" according to the present invention. The control device 2 includes two functional sections, namely the first voltage control section 22 and the second voltage control section 23, as the voltage control section 21 that generates the switching control signals Pu, Nu, Pv, Nv, Pw, and Nw for controlling the inverter 6 from the d-axis voltage command value Vd and the q-axis voltage command value Vq.

The first voltage control section 22 receives the d-axis voltage command value Vd and the q-axis voltage command value Vq as inputs. The first voltage control section 22 further receives the DC voltage Vdc detected by a voltage sensor (not shown) as an input. The first voltage control section 22 performs first voltage control computation in which the modulation rate M and the voltage command phase qv are derived on the basis of the input d-axis voltage command value Vd, q-axis voltage command value Vq, and DC voltage Vdc. Here, the modulation rate M represents the ratio of the effective value of the fundamental-wave component of the output voltage waveform of the inverter 6 to the DC voltage Vde. In the example, the modulation rate M is defined as the ratio of the effective value of the voltage command values Vd and Vq for two phases to the DC voltage Vdc. Specifically, the modulation rate M is calculated in accordance with Formula (4) below:

$$M=\sqrt{(Vd2+Vq2)}/Vdc \quad (4)$$

The voltage command phase qv is the phase angle between the voltage vectors represented by the voltage command values Vd and Vq for two phases, and corresponds to the angle formed between a synthesized voltage vector generated by synthesizing a d-axis voltage vector associated with the d-axis voltage command value Vd and a q-axis voltage vector associated with the q-axis voltage command value Vq and the d-axis voltage vector associated with the d-axis voltage command value Vd. In the example, the voltage command phase qv is calculated in accordance with Formula (5) below:

$$qv = \tan-1(Vq/Vd) \quad (5)$$

The voltage command phase qv corresponds to the phase of the origin of the u-phase voltage command value Vu with reference to the origin (q=0°) of the magnetic pole position q.

As the rotational speed w of the electric motor MG becomes higher, the voltage induced by the electric motor MG becomes higher, and hence the AC voltage required to drive the electric motor MG (hereinafter referred to a "required voltage") also becomes higher. When the required voltage exceeds the maximum AC voltage that can be output from the inverter 6 through conversion of the DC voltage Vdc at that time (hereinafter referred to as a "maximum output voltage"), it is not possible to provide the stator coils with required currents, whereby the electric motor MG cannot be controlled appropriately. Therefore, the control device 2 is configured to perform so-called field weakening control in which the current phase is adjusted (advanced compared to that in the maximum torque control) such that the stator coils produce a magnetic flux in the direction in which the field magnetic flux of the electric motor MG is weakened. Thus, in the embodiment, the d-axis current adjustment command value DId is derived on the basis of the modulation rate M derived by the first voltage control section 22, and the fundamental d-axis current command value Idb and the q-axis current command value Iq are adjusted on the basis of the derived d-axis current adjustment command value DId.

More specifically, a subtractor 17 receives the modulation rate M and a value of "0.78" which is the theoretical maximum value of the modulation rate M as inputs. The subtractor 17 subtracts the value of "0.78" from the modulation rate M to derive a modulation rate deviation DM as indicated by Formula (6) below:

$$DM=M-0.78 \quad (6)$$

The current adjustment command value derivation section 16 receives the derived modulation rate deviation DM as an input. The current adjustment command value derivation section 16 integrates the modulation rate deviation DM using a predetermined gain to derive the d-axis current adjustment command value DId. As indicated by Formula (1) above, the d-axis current adjustment command value DId is subtracted from the fundamental d-axis current command value Idb to derive the final d-axis current command value Id. That is, the d-axis current adjustment command value DId is used as a field weakening command value with which the field magnetic flux of the electric motor MG is weakened.

Figure 3:
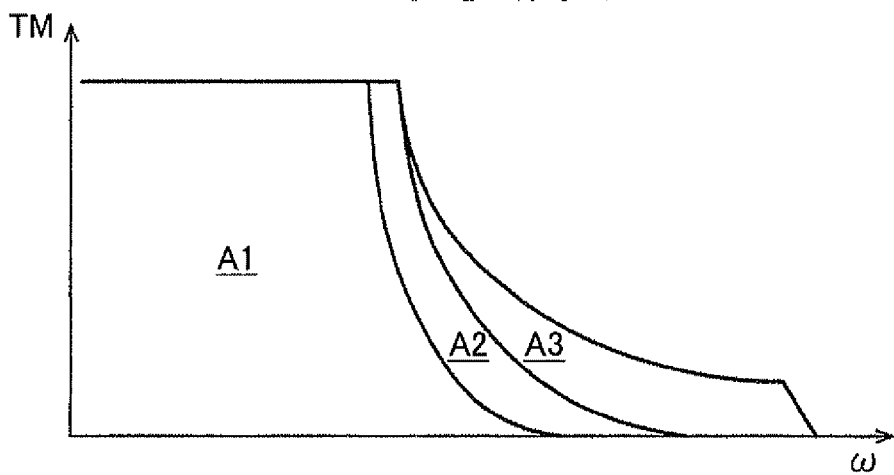
FIG. 3 shows an exemplary map referenced to determine a control mode.

The control device 2 according to the embodiment further includes a mode determination section 51 that determines a control mode for controlling the electric motor drive device, and a carrier frequency determination section 52 that determines a carrier frequency of the inverter 6. The mode determination section 51 receives at least the target torque TM and the rotational speed w as input variables. The mode determination section 51 determines one of a plurality of control modes set in advance for controlling the electric motor drive device 1 on the basis of the input target torque TM and rotational speed w. The control device 2 includes a map for determining the control mode stored in the parameter memory 64 or the like. In the embodiment, as shown in FIG. 3, three areas in which the electric motor MG is operable, namely a first area A1, a second area A2, and a third area A3, are provided in the map. Correspondingly, three control modes selectable by the mode determination section 51 are provided. That is, the mode determination section 51 selects a first control mode in the case where the relationship between the target torque TM and the rotational speed w is in the first area A1, selects a second control mode in the case where the relationship between the target torque TM and the rotational speed w is in the second area A2, and selects a third control mode in the case where the relationship between the target torque TM and the rotational speed w is in the third area A3.

As control methods associated with the control modes for controlling the electric motor drive device 1, there are two types of control methods with respect to waveform of the AC voltage supplied from the inverter 6 to the electric motor MG; namely PWM control and rectangular-wave control, and there are two types of control methods with respect to phase of the AC voltage supplied from the inverter 6 to the electric motor MG, namely maximum torque control and field weakening control. In the embodiment, further, the PWM control includes two types of control schemes, namely sinusoidal-wave PWM control and overmodulation PWM control. The three modes selectable by the mode determination section 51 are defined by combining such control methods.

In the first control mode, the inverter 6 performs the sinusoidal-wave PWM control along with the maximum torque control for DC/AC conversion performed in the inverter 6. In the sinusoidal-wave PWM control, the respective switching elements of the inverter 6 are controlled to turn on and off on the basis of a comparison between sinusoidal AC voltage command values Vu, Vv, and Vw and a carrier (carrier wave). The sinusoidal AC voltage command values Vu, Vv, and Vw are derived by a three-phase command value derivation section 35 of the second voltage control section 23 to be discussed later.

In the second control mode, the inverter 6 performs the overmodulation PWM control along with the maximum torque control for DC/AC conversion performed in the inverter 6. In the overmodulation PWM control, the waveform of the fundamental-wave component of the output voltage waveform of the inverter 6 is distorted to obtain an amplitude larger than the sinusoidal AC voltage command values Vu, Vv, and Vw in the sinusoidal-wave PWM control. In that state, the respective switching elements of the inverter 6 are controlled to turn on and off on the basis of a comparison between the distorted sinusoidal AC voltage command values Vu, Vv, and Vw and the carrier as in the sinusoidal-wave PWM control. This allows execution of PWM control in which a high-level period or a low-level period is provided at portions where the AC voltage command values Vu, Vv, and Vw exceed the amplitude of the carrier wave. The distorted sinusoidal AC voltage command values Vu, Vv, and Vw are derived by the three-phase command value derivation section 35 of the second voltage control section 23 to be discussed later.

In the third control mode, the inverter 6 performs the rectangular-wave control along with the field weakening control for DC/AC conversion performed in the inverter 6. In the rectangular-wave control, the respective switching elements of the inverter 6 are controlled to turn on once and turn off once per one cycle in terms of electrical angle (360° in terms of the magnetic pole position q). In this event, the AC voltage command values Vu, Vv, and Vw for the respective phases form a rectangular wave in which one high-level period and one low-level period alternately appear per one cycle. Thus, in the embodiment, in the third control mode, the AC voltage command values Vu, Vv, and Vw for the respective phases are simply used as command values of on/off switching phases, which are the phases of the magnetic pole position q, representing the timing at which the respective switching elements of the inverter 6 are switched on and off.

In the third control mode in which the rectangular-wave control is performed, synchronous control in which the cycle of the electrical angle of the electric motor MG detected as the magnetic pole position q and the cycle of the on/off timing of the switching elements of the inverter 6 are synchronized with each other is performed. On the other hand, in the first control mode in which the sinusoidal-wave PWM control is performed and the second control mode in which the overmodulation PWM control is performed, asynchronous control in which the cycle of the AC voltage command values Vu, Vv, and Vw and the cycle of the carrier for the switching control signals Pu, Nu, Pv, Nv, Pw, and Nw are not synchronized with each other is performed. That is, in the embodiment, the third control mode is included in the "synchronous control mode", and the first control mode and the second control mode are included in the "asynchronous control mode". The mode determination section 51 has a function of selecting one of the synchronous control mode and the asynchronous control mode. As described later, in addition, a voltage control switching section 46 switches between control blocks in the second voltage control section 23 depending on which of the synchronous control mode and the asynchronous control mode is selected by the mode determination section 51 in order to switch between schemes for generating the AC voltage command values Vu, Vv, and Vw and the switching control signals Pu, Nu, Pv, Nv, Pw, and Nw. The details will be discussed later.

In the embodiment, further, the mode determination section 51 receives the d-axis current adjustment command value DId derived by the current adjustment command value derivation section 16 as an input. The mode determination section 51 then determines whether or not the third control mode can be selected on the basis of the input d-axis current adjustment command value DId. More specifically, the mode determination section 51 permits selecting the third control mode in the case where the d-axis current adjustment command value DId is a predetermined third control mode transition permission threshold or more, and prohibits selecting the third control mode in the case where the d-axis current adjustment command value DId is less than the predetermined third control mode transition permission threshold. Thus, while the mode determination section 51 according to the embodiment basically determines the control mode on the basis of the input target torque TM and rotational speed w, the mode determination section 51 is configured to impose certain limitations on the selection of the control mode on the basis of the input d-axis current adjustment command value DId. More specifically, the mode determination section 51 selects one of the first control mode, the second control mode, and the third control mode on the basis of the target torque TM and the rotational speed w in the case where the d-axis current adjustment command value DId is the third control mode transition permission threshold or more, and selects one of the first control mode and the second control mode on the basis of the target torque TM and the rotational speed w in the case where the d-axis current adjustment command value DId is less than the third control mode transition permission threshold. In the embodiment, the target torque TM, the rotational speed w, and the d-axis current adjustment command value DId correspond to the "mode determination input variable" according to the present invention.

The carrier frequency determination section 52 receives at least the rotational speed w and the modulation rate M derived by the first voltage control section 22 as input variables. The carrier frequency determination section 52 determines a carrier frequency Fc, which is the frequency of the carrier (carrier wave) for the switching control signals Pu, Nu, Pv, Nv, Pw, and Nw for the inverter 6, on the basis of the input modulation rate M and rotational speed w. In the embodiment, the control device 2 includes a map for determining the carrier frequency stored in the parameter memory 64 or the like. The carrier frequency determination section 52 determines the optimum carrier frequency Fc for reducing a loss in the inverter 6 or a loss in the electric motor MG in accordance with the modulation rate M, the rotational speed w, etc. In this event, the carrier frequency determination section 52 selects the optimum carrier frequency from a plurality of selectable carrier frequencies determined in advance on the basis of the map, for example. In the embodiment, the modulation rate M and the rotational speed w correspond to the "carrier frequency determination input variable" according to the present invention.

The second voltage control section 23 receives the modulation rate M and the voltage command phase qv derived by the first voltage control section 22 as inputs. The second voltage control section 23 further receives the magnetic pole position q detected by the rotation sensor 8 (see FIG. 1) and the carrier frequency Fc determined by the carrier frequency determination section 52 as inputs. The second voltage control section 23 performs second voltage control computation in which the AC voltage command values Vu, Vv, and Vw are determined and the switching control signals Pu, Nu, Pv, Nv, Pw, and Nw for the inverter 6 on the basis of the input modulation rate M, voltage command phase qv, magnetic pole position q, and carrier frequency Fc. In the embodiment, the second voltage control section 23 includes the three-phase command value derivation section 35, an asynchronous control signal generation section 41, an on/off switching phase derivation section 43, and a synchronous control signal generation section 42.

The voltage control switching section 46 is provided between the first voltage control section 22 and the second voltage control section 23. The voltage control switching section 46 switches between control blocks in the second voltage control section 23 in accordance with the control mode selected by the mode determination section 51. Specifically, in the case where the first control mode or the second control mode included in the asynchronous control mode is selected, the modulation rate M and the voltage command phase qv derived by the first voltage control section 22 are input to the three-phase command value derivation section 35 to cause the three-phase command value derivation section 35 and the asynchronous control signal generation section 41 to perform the second voltage control computation. On the other hand, in the case where the third control mode included in the synchronous control mode is selected, the modulation rate M and the voltage command phase qv derived by the first voltage control section 22 are input to the on/off switching phase derivation section 43 to cause the on/off switching phase derivation section 43 and the synchronous control signal generation section 42 to perform the second voltage control computation. The voltage control switching section 46 switches which component the modulation rate M and the voltage command phase qv are input to in accordance with the control mode selected by the mode determination section 51. This allows the second voltage control section 23 to generate the switching control signals Pu, Nu, Pv, Nv, Pw, and Nw in accordance with the control mode determined by the mode determination section 51.

Figure 4:
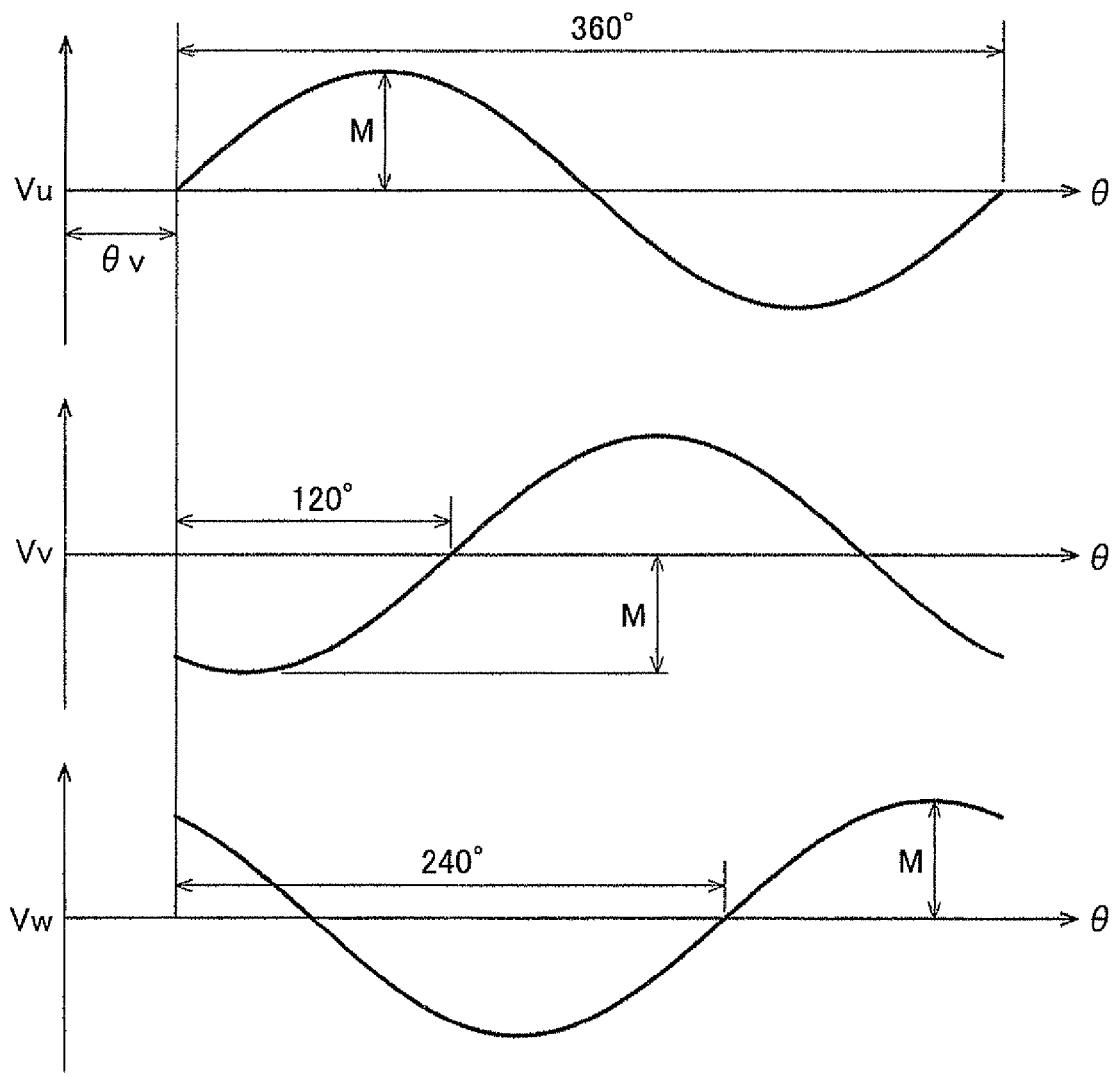
FIG. 4 shows an example of AC voltage command values in a first control mode.

The three-phase command value derivation section 35 generates the sinusoidal AC voltage command values Vu, Vv, and Vw for three phases on the basis of the input modulation rate M and voltage command phase qv. FIG. 4 shows an example of the AC voltage command values Vu, Vv, and Vw generated by the three-phase command value derivation section 35. The drawing shows a case where the AC voltage command values Vu, Vv, and Vw are sinusoidal voltage command values for the first control mode. In this case, the u-phase voltage command value Vu is represented by a sinusoidal wave with a phase that is delayed by the voltage command phase qv with respect to the origin (q=0°) of the magnetic pole position q, an amplitude that is equal to the modulation rate M, and a cycle that is equal to one cycle of the magnetic pole position q (one cycle in terms of electrical angle, namely 360°). The v-phase voltage command value Vv is represented by a sinusoidal wave with a phase that is delayed by 120° with respect to the u-phase voltage command value Vu. The w-phase voltage command value Vw is represented by a sinusoidal wave with a phase that is delayed by 240° with respect to the u-phase voltage command value Vu. In the case where the second control mode is selected, the AC voltage command values Vu, Vv, and Vw are respectively represented by distorted sinusoidal waves with the same phase and amplitude as those of the sinusoidal waves shown in FIG. 4.

Here, the three-phase command value derivation section 35 includes an AC voltage command value map defining the waveforms of the AC voltage command values Vu, Vv, and Vw for each control mode, and generates the AC voltage command values Vu, Vv, and Vw using the AC voltage command value map in accordance with the control mode determined by the mode determination section 51 to output the generated AC voltage command values. The AC voltage command value map, for example in the map for the first control mode, defines a sinusoidal voltage waveform with the origin coinciding with the origin (q=0°) of the magnetic pole position q and an amplitude of 1. The three-phase command value derivation section 35 can generate the u-phase voltage command value Vu by delaying the origin of the voltage waveform defined in the map by the voltage command phase qv and multiplying the amplitude of the voltage waveform by the modulation rate M, and can respectively generate the v-phase voltage command value Vv and the w-phase voltage command value Vw by delaying the phase of the u-phase voltage command value Vu by 120° and 240°. The three-phase command value derivation section 35 includes different voltage waveform maps for the respective control modes.

The asynchronous control signal generation section 41 receives the AC voltage command values Vu, Vv, and Vw generated by the three-phase command value derivation section 35 and the carrier frequency Fe determined by the carrier frequency determination section 52. The asynchronous control signal generation section 41 generates the switching control signals Pu, Nu, Pv, Nv, Pw, and Nw for the inverter 6 on the basis of the AC voltage command values Vu, Vv, and Vw. Specifically, the asynchronous control signal generation section 41 compares the AC voltage command values Vu, Vv, and Vw and the carrier (carrier wave) to generate the six switching control signals Pu, Nu, Pv, Nv, Pw, and Nw for performing the PWM control on the respective switching elements of the inverter 6 in the upper stage for u-phase, in the lower stage for u-phase, in the upper stage for v-phase, in the lower stage for v-phase, in the upper stage for w-phase, and in the lower stage for w-phase. In this event, the carrier frequency Fc is not an integer multiple of the frequency of the AC voltage command values Vu, Vv, and Vw, and hence the carrier cycle obtained from the carrier frequency Fc and the cycle of the AC voltage command values Vu, Vv, and Vw are not synchronous with each other.

Figure 5:
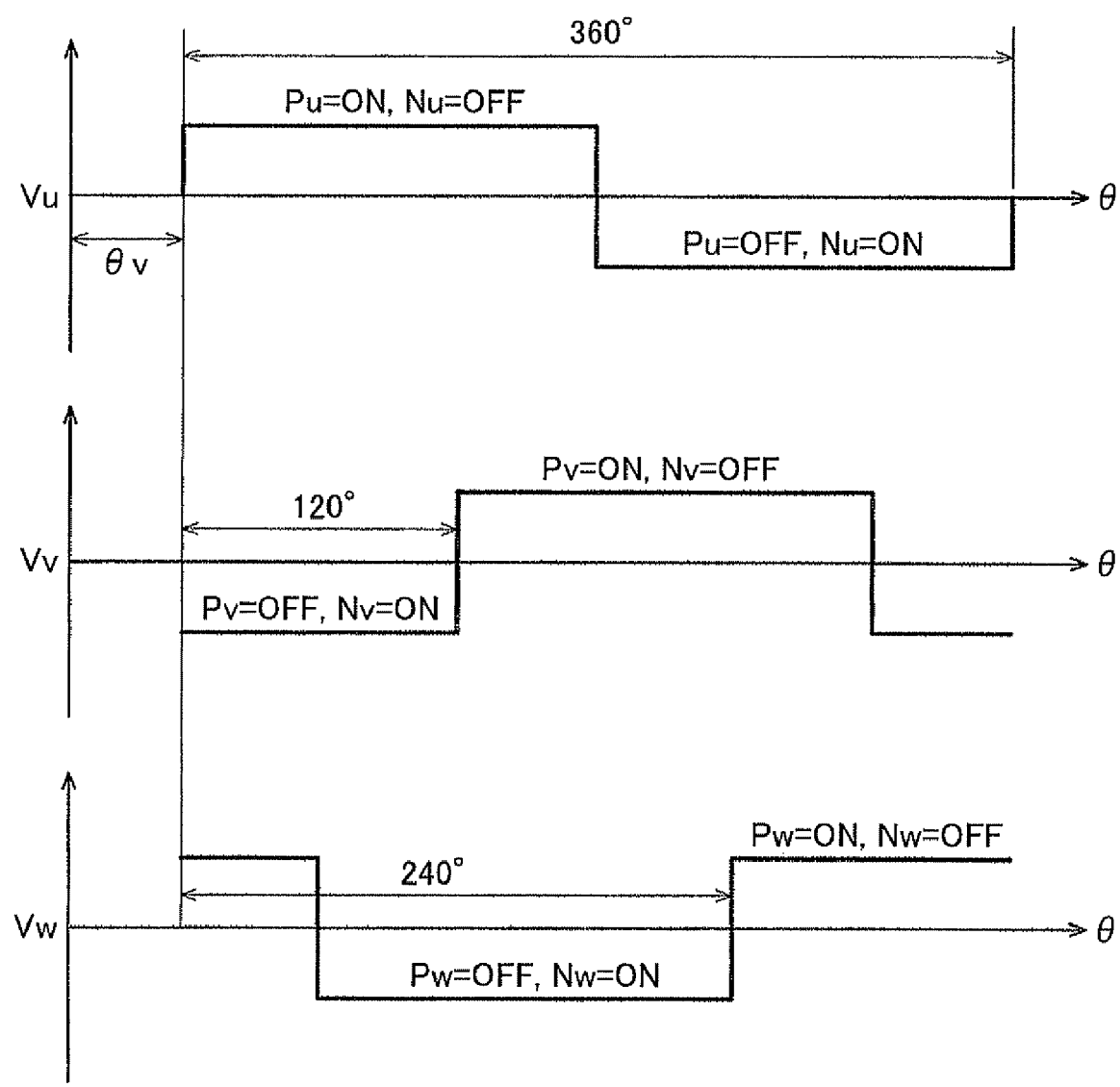
FIG. 5 shows an example of the AC voltage command values in a third control mode.

The on/off switching phase derivation section 43 generates the command values of the on/off switching phases of the respective switching elements of the inverter 6 as the AC voltage command values Vu, Vv, and Vw on the basis of the input modulation rate M and voltage command phase qv. The command values correspond to on/off control signals for the respective switching elements, and represent the phase of the magnetic pole position q representing the timing at which the respective switching elements are switched on and off FIG. 5 shows the content represented by the AC voltage command values Vu, Vv, and Vw generated by the on/off switching phase derivation section 43. The phase at which the respective switching elements are switched on and off is indicated on the horizontal axis representing the magnetic pole position q. In this example, the u-phase voltage command value Vu has a phase that is delayed by the voltage command phase qv with respect to the origin (q=0°) of the magnetic pole position q and a cycle matching one cycle of the magnetic pole position q (one cycle in terms of electrical angle, namely 360°). At the voltage command phase qv, the switching control signal Pu corresponding to the switching element in the upper stage for the u-phase is turned on, and the switching control signal Nu corresponding to the switching element in the lower stage for the u-phase is turned off. At half a cycle of the magnetic pole position q (half a cycle in terms of electrical angle, namely 180°) from the voltage command phase qv, the switching control signal Pu corresponding to the switching element in the upper stage for the u-phase is turned off, and the switching control signal Nu corresponding to the switching element in the lower stage for the u-phase is turned on. The v-phase voltage command value Vv is the same as the u-phase voltage command value Vu except for having a phase that is delayed by 120° with respect to the u-phase voltage command value Vu. The w-phase voltage command value Vw is the same as the u-phase voltage command value Vu except for having a phase that is delayed by 240° with respect to the u-phase voltage command value Vu. The AC voltage command values Vu, Vv, and Vw actually output from the on/off switching phase derivation section 43 may be formed by only information on the phase of the magnetic pole position q representing the timing at which the respective switching elements for u-phase, v-phase, and w-phase are switched on and off. Thus, the command values of the on/off switching phases may be output as a string of information in which the command values for u-phase, v-phase, and w-phase are collected.

Here, the on/off switching phase derivation section 43 includes an on/off switching phase map defining the on/off switching phases of the respective switching elements forming the AC voltage command values Vu, Vv, and Vw for each control mode, and generates the AC voltage command values Vu, Vv, and Vw on the basis of the on/off switching phase map to output the generated AC voltage command values. For example, the on/off switching phase map defines a phase, with the origin coinciding with the origin (q=0°) of the magnetic pole position q, at which switching is performed between a state where the switching element in the upper state is turned on and the switching element in the lower state is turned off and a state where the switching element in the upper state is turned off and with the switching element in the lower state is turned on for each of u-phase, v-phase, and w-phase. The on/off switching phase derivation section 43 can generate the u-phase voltage command value Vu by delaying the origin of the on/off phase defined in the map by the voltage command phase qv, and can respectively generate the v-phase voltage command value Vv and the w-phase voltage command value Vw by delaying the phase of the u-phase voltage command value Vu by 120° and 240°.

The synchronous control signal generation section 42 receives the AC voltage command values Vu, Vv, and Vw generated by the on/off switching phase derivation section 43 as inputs. The synchronous control signal generation section 42 generates the switching control signals Pu, Nu, Pv, Nv, Pw, and Nw for the inverter 6 on the basis of the AC voltage command values Vu, Vv, and Vw. Specifically, the synchronous control signal generation section 42 generates the six switching control signals Pu, Nu, Pv, Nv, Pw, and Nw for controlling turning on/off of the respective switching elements of the inverter 6 in the upper stage for u-phase, in the lower stage for u-phase, in the upper stage for v-phase, in the lower stage for v-phase, in the upper stage for w-phase, and in the lower stage for w-phase in accordance with the command values of the on/off switching phases of the respective switching elements of the inverter 6. In this event, the second voltage control section 23 which includes the synchronous control signal generation section 42 performs voltage control computation in each predetermined computation cycle, and the switching control signals Pu, Nu, Pv, Nv, Pw, and Nw are output in each predetermined computation cycle to change the timing at which the respective switching elements are switched on and off. Thus, while the timing at which the respective switching elements are switched on and off is changed in each predetermined computation cycle, the respective switching elements of the inverter 6 are controlled in sync with the rotational speed w of the electric motor MG.

1-3. Relationship Between Computation Cycles of Respective Functional Sections Next, the relationship between the computation cycles of the respective functional sections provided in the control device 2, which is the key feature of the present invention, will be described. Here, in particular, the relationship between the computation cycles of the current control section 13, the first voltage control section 22, the second voltage control section 23, the mode determination section 51, and the carrier frequency determination section 52 will be described. A sequence of control processes (electric motor control process) performed by the functional sections is started by the CPU 61 by executing an interrupt function in each reference computation cycle T0 (a control cycle used as a reference) set by the timer 66 (see FIG. 1) of the CPU 61. In the example, the reference computation cycle T0 is set to 300 [ms].

In the description below, the computation processes performed by the current control section 13, the first voltage control section 22, the second voltage control section 23, the mode determination section 51, and the carrier frequency determination section 52 are respectively referred to as a current control process, a first voltage control process, a second voltage control process, a mode determination process, and a carrier frequency determination process. Also, the computation cycle of the second voltage control process performed by the second voltage control section 23 is defined as a first computation cycle T1, the computation cycle of the first voltage control process performed by the first voltage control section 22 is defined as a second computation cycle T2, the computation cycle of the current control process performed by the current control section 13 is defined as a third computation cycle T3, the computation cycle of the mode determination process performed by the mode determination section 51 is defined as a fourth computation cycle T4, and the computation cycle of the carrier frequency determination process performed by the carrier frequency determination section 52 is defined as a fifth computation cycle T5.

Prior to describing the computation cycles of the respective functional sections, the update cycles of the various input variables during execution of the current control process, the first voltage control process, the second voltage control process, the mode determination process, and the carrier frequency determination process will be described. As has been described so far, the various input variables used in the embodiment include the target torque TM, the magnetic pole position q, the current detection values Idr and Iqr (Iur, Ivr, and Iwr), the d-axis current adjustment command value DId, the rotational speed w, the DC voltage Vdc, and the modulation rate M. In the example, the update cycles of the input variables are set to predetermined values given in Table 1 below. The values are exemplary for ease of description.

TABLE 1

| INPUT VARIABLE | UPDATE CYCLE |
| --- | --- |
| TARGET TORQUE TM | 6.0 ms |
| MAGNETIC POLE POSITION □ | 300 s |
| CURRENT DETECTION VALUES Idr AND Iqr | 600 s |
| d-AXIS CURRENT ADJUSTMENT COMMAND VALUE □Id | 6.0 ms |
| ROTATIONAL SPEED □ | 6.0 ms |
| DC VOLTAGE Vdc | 6.0 ms |

As shown in Table 1, the update cycle of the magnetic pole position q is set to be equal to the reference computation cycle T0 (=300 [ms]), which is the shortest computation process, in order to enable smooth rotation of the electric motor MG. That is, the rotation sensor 8 detects the magnetic pole position q in each reference computation cycle T0 (=300 [ms]). Meanwhile, the update cycle of the current detection values Idr and Iqr (current detection values Iur, Ivr, and Iwr for three phases) is set to twice 600 [ms]) the reference computation cycle T0. That is, the current sensor 7 detects the current detection values Iur, Ivr, and Iwr for three phases and the three-phase/two-phase conversion section 36 converts the current detection values Iur, Ivr, and Iwr into the d-axis current detection value Idr and the q-axis current detection value Iqr once with every second detection of the magnetic pole position q. The update cycle of the target torque TM, the d-axis current adjustment command value DId, the rotational speed w, and the DC voltage Vdc is set to 20 times the reference computation cycle T0 (=6.0 [ms]), which is further longer than the update cycle of the magnetic pole position q and the current detection values Idr and Iqr. The update cycle of the modulation rate M is set to 600 [ms], which is the second computation cycle T2 of the first voltage control process to be discussed later.

Corresponding to the update cycles of the input variables set as described above, the control device 2 for the electric motor drive device 1 suitably completes execution of the second voltage control process, the first voltage control process, the current control process, the mode determination process, and the carrier frequency determination process to obtain the respective results in cycles given in Table 2 below which are different from each other, for example. The respective cycles of the processes are exemplary for ease of description.

TABLE 2

| PROCESS | CYCLE |
|---|---|
| SECOND VOLTAGE CONTROL PROCESS | 300 s |
| FIRST VOLTAGE CONTROL PROCESS | 600 s |
| CURRENT CONTROL PROCESS | 600 s |
| MODE DETERMINATION PROCESS | 6.0 ms |
| CARRIER FREQUENCY DETERMINATION PROCESS | 6.0 ms |

In the embodiment, as shown in Table 2, the results of the second voltage control process are required in the shortest cycle. This is because the switching control signals Pu, Nu, Pv, Nv, Pw, and Nw for controlling the inverter 6 are preferably generated and output with as high a resolution as possible in correspondence with variations in magnetic pole position q of the electric motor MG at all times in order to allow smooth rotation of the electric motor MG. That is, the second voltage control process is preferably executed in a cycle that is equal to the update cycle of the magnetic pole position q. Thus, in the example, the computation cycle T1 of the second voltage control process is set to be equal to 300 [ms] which is the update cycle of the magnetic pole position q. As described above, the update cycle of the magnetic pole position q is equal to the reference computation cycle T0, and accordingly the second voltage control process is executed in each reference computation cycle T0 which is the cycle of interrupt handling performed by the CPU 61.

In the embodiment, the results of the current control process are required in the second shortest cycle next to the second voltage control process. This is because the current control process, which is a computation process for deriving the d-axis voltage command value Vd and the q-axis voltage command value Vq to be used in the computation processes performed by the voltage control section 21 including the second voltage control process, is also preferably executed in a short cycle in accordance with variations in current detection values Idr and Iqr (Iur, Ivr, and Iwr) which are detection values of currents actually flowing through the electric motor MG In general normal electric motor control such as the maximum torque control, however, the priority of the current control process may be made lower than that of the second voltage control process for generating and outputting the switching control signals Pu, Nu, Pv, Nv, Pw, and Nw. For example, the current control process may be executed once while the second voltage control process is executed twice. Thus, in the example, the third computation cycle T3 of the current control process is set to be longer than the first computation cycle T1 of the second voltage control process, and more specifically to twice (=600 [ms]) the first computation cycle T1. This allows the current control process to be executed once in two reference computation cycles T0 which are each the cycle of interrupt handling performed by the CPU 61, and to be executed once while the second voltage control process is executed twice. In the example, the third computation cycle T3 of the current control process is equal to the update cycle of the current detection values Idr and Iqr (Iur, Ivr, and Iwr).

At this time, in the case where the two electric motors MG1 and MG2 are provided to be controlled by the electric motor drive device 1 as in the embodiment, as well shown in FIG. 7, the CPU 61 can perform respective current control processes for the electric motors MG1 and MG2 alternately in each half cycle (=reference computation cycle T0) of the third computation cycle T3. For example, it is suitable to monitor whether the current number of times of executing the reference computation cycle T0 is an odd number or an even number in the repeated execution of the reference computation cycle T0, and to execute one of the current control process associated with the first electric motor MG1 and the current control process associated with the second electric motor MG2 depending on the monitoring results.

In the embodiment, the results of the first voltage control process are also required in the second shortest cycle next to the second voltage control process. This is because the first voltage control process which is a computation process for deriving the modulation rate M and the voltage command phase qv to be used in the second voltage control process is preferably executed in as short a cycle as possible. In the embodiment, the second computation cycle T2 of the first voltage control process is set to 600 [ms]. In the first voltage control process, the first voltage control section 22 derives the modulation rate M and the voltage command phase qv on the basis of the d-axis voltage command value Vd and the q-axis voltage command value Vq, Thus, even if the second computation cycle T2 of the first voltage control process is shorter than the third computation cycle T3 of the current control process, the modulation rate M and the voltage command phase qv with the same value are derived in the case where the d-axis voltage command value Vd and the q-axis voltage command value Vq are not varied from those in the preceding cycle. In this case, the same computation process as the first voltage control process performed in the preceding cycle is repeated, which means that computation process is unnecessarily performed. Hence, in the embodiment, the second computation cycle T2 of the first voltage control process is set to 600 [ms] which is equal to the third computation cycle T3 of the current control process to avoid such unnecessary computation processing. In this case, the second computation cycle T2 of the first voltage control process is longer than the first computation cycle T1 of the second voltage control process, and more specifically is twice the first computation cycle T1 of the second voltage control process. This allows the first voltage control process to be executed once in two reference computation cycles T0 which are each the cycle of interrupt handling performed by the CPU 61, and to be executed once while the second voltage control process is executed twice. Also, the first voltage control process is executed once while the current control process is executed once.

At this time, in the case where the two electric motors MG1 and MG2 are provided to be controlled by the electric motor drive device 1 as in the embodiment, as well shown in FIG. 7, the CPU 61 can perform respective first voltage control processes for the electric motors MG1 and MG2 alternately in each half cycle (=reference computation cycle T0) of the second computation cycle T2 as in the case of the current control process. For example, it is suitable to monitor whether the current number of times of executing the reference computation cycle T0 is an odd number or an even number in the repeated execution of the reference computation cycle T0, and to execute one of the first voltage control process associated with the first electric motor MG1 and the first voltage control process associated with the second electric motor MG2 depending on the monitoring results.

The variation rate of the DC voltage Vdc, which is referenced by the first voltage control section 22 to derive the modulation rate M and the voltage command phase qv, is sufficiently low compared to the respective variation rates of the d-axis voltage command value Vd and the q-axis voltage command value Vq. Hence, the update cycle of the DC voltage Vdc is set to be long at 6.0 [ms], and thus it is less necessary to consider the update cycle of the DC voltage Vdc.

In the embodiment, the results of the mode determination process and the carrier frequency determination process are not required in a very short cycle. Thus, it is sufficient that such computation processes should be executed in each update cycle of the respective input variables. In the case where a plurality of input variables are provided, such computation processes may be executed in the longest one of the update cycles of the plurality of input variables. As described above, the mode determination input variables for the mode determination process include the target torque TM, the rotational speed w, and the d-axis current adjustment command value DId. In the example, as shown in Table 1, the update cycles of such input variables are all set to 6.0 [ms] which is longer than the second computation cycle T2 (=600 [ms]) of the first voltage control process. Hence, the fourth computation cycle T4 of the mode determination process is accordingly set to 6.0 [ms]. Thus, the fourth computation cycle T4 of the mode determination process is sufficiently longer than the second computation cycle T2 of the first voltage control process and the first computation cycle T1 of the second voltage control process. In the example, the mode determination process is executed once while the second voltage control process is executed 20 times (and the first voltage control process and the current control process are executed 10 times).

The carrier frequency determination input variables for the carrier frequency determination process include the modulation rate M and the rotational speed w. In the example, the update cycle of the rotational speed w, which is the longer one of the update cycles of such input variables, is set to 6.0 [ms] which is longer than the second computation cycle T2 (=600 [ms]) of the first voltage control process. Hence, the fifth computation cycle T5 of the carrier frequency determination process is accordingly set to 6.0 [ms]. Thus, the fifth computation cycle T5 of the carrier frequency determination process is sufficiently longer than the second computation cycle T2 of the first voltage control process and the first computation cycle T1 of the second voltage control process. In the example, the carrier frequency determination process is executed once while the second voltage control process is executed 20 times (and the first voltage control process and the current control process are executed 10 times).

1-4. Procedures of Electric Motor Control Process

Figure 6:
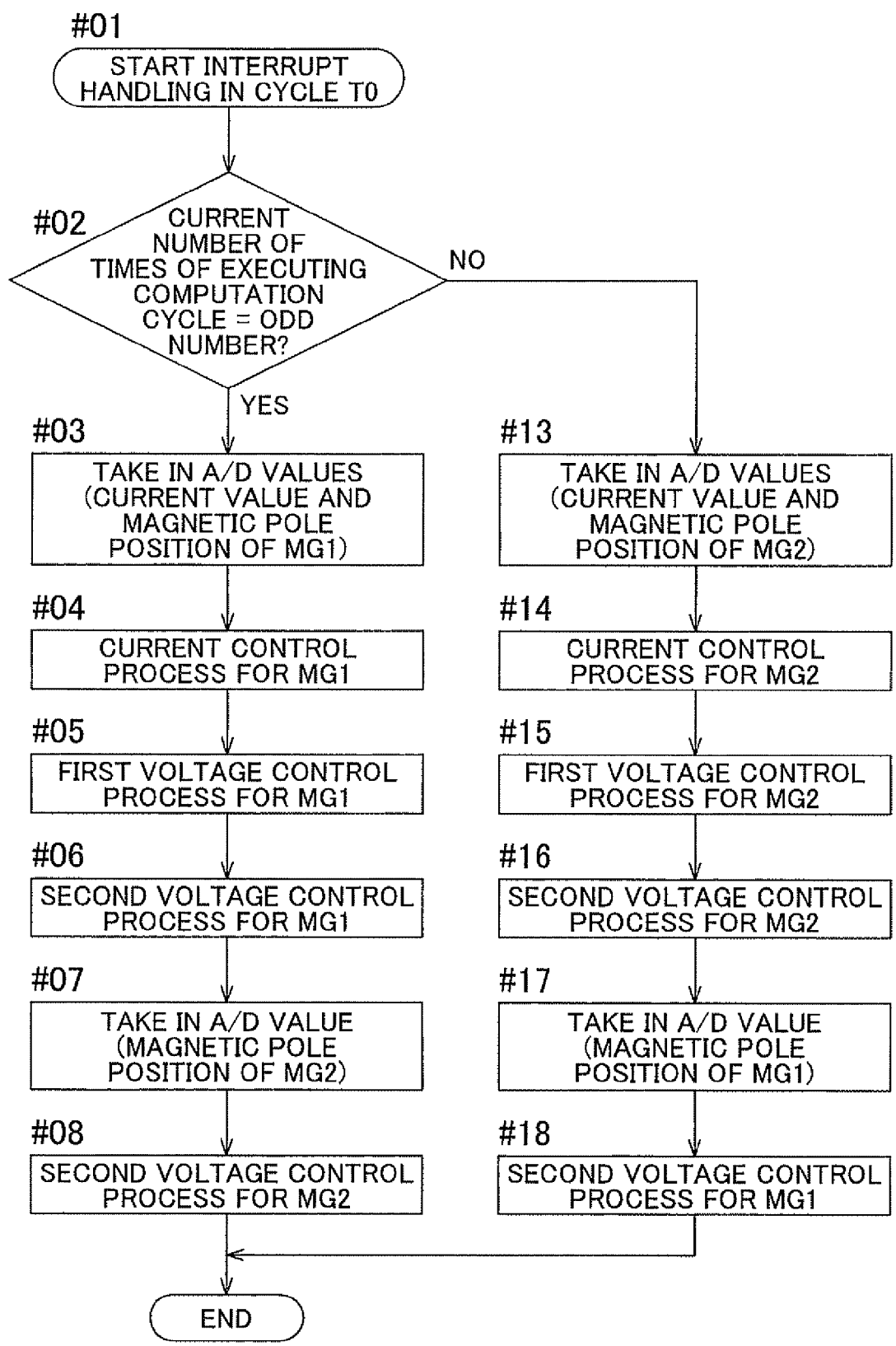
FIG. 6 is a flowchart showing process procedures of an electric motor control process according to the first embodiment.

Next, procedures of the electric motor control process according to the embodiment will be described with reference to the flowchart of FIG. 6 and the time chart of FIG. 7. Procedures of the electric motor control process described below are executed by the respective functional sections of the control device 2. In the embodiment, the respective functional sections of the control device 2 are formed by the electric motor control program stored in the program memory 63 (see FIG. 1), and the CPU core 62 provided in the control device 2 and serving as the computation processing unit operates as a computer that executes the electric motor control program.

In the electric motor control process according to the embodiment, as shown in FIG. 7, magnetic pole position sampling (PS1) for the first electric motor MG1 and magnetic pole position sampling (PS2) for the second electric motor MG2 are executed in each reference computation cycle T0 which is the cycle of interrupt handling performed by the CPU 61. The reference computation cycle T0 is equal to the first computation cycle T1 of the second voltage control process. Also, current value sampling (IS1) for the first electric motor MG1 and current value sampling (IS2) for the second electric motor MG2 are executed in each cycle corresponding to twice the reference computation cycle T0. The cycle corresponding to twice the reference computation cycle T0 is equal to the second computation cycle T2 of the first voltage control process. The cycle of the current value sampling (IS1) for the first electric motor MG1 and the cycle of the current value sampling (IS2) for the second electric motor MG2 are shifted from each other by half the second computation cycle T2 of the first voltage control process (which is equal to the reference computation cycle T0). This allows the current value sampling (IS1) for the first electric motor MG 1 and the current value sampling (IS2) for the second electric motor MG2 to be executed alternately in different reference computation cycles T0. The sampling results are temporarily stored in an analog memory (not shown) or the like. The magnetic pole position q of each of the electric motors MG is detected through the magnetic pole position sampling, and the current detection values Iur, Ivr, and Iwr of currents flowing through each of the electric motors MG are detected through the current value sampling.

When interrupt handling is executed by the CPU 61 (step #01), it is first determined whether or not the current number of times of executing the first computation cycle T1 (=reference computation cycle T0) is an odd number (step #02). If it is determined that the current number of times of executing the first computation cycle T1 is an odd number (step #02: Yes), the magnetic pole position q and the current detection values Iur, Ivr, and Iwr of the first electric motor MG1 temporarily stored in the analog memory are converted into digital data by the A/D converter 67 (see FIG. 1) and are taken in (PT1+IT1, step #03) as shown, for example, in the first computation cycle T11 executed first time as shown in FIG. 7. Next, the current control process for the first electric motor MG1 is executed (IC1, step #04). In the current control process, the d-axis voltage command value Vd and the q-axis voltage command value Vq are derived on the basis of the d-axis current command value Id and the q-axis current command value Iq, the d-axis current detection value 1dr and the q-axis current detection value Iqr, and the rotational speed w of the rotor of the electric motor MG. In the example, the current control process also includes a process in which three-phase/two-phase conversion is performed on the current detection values Iur, Ivr, and Iwr to obtain the d-axis current detection value Idr and the q-axis current detection value Iqr. Next, the first voltage control process for the first electric motor MG1 is executed (MC1, step #05). In the first voltage control process, the modulation rate M and the voltage command phase qv are derived on the basis of the d-axis voltage command value Vd, the q-axis voltage command value Vq, and the DC voltage Vdc. Next, the second voltage control process for the first electric motor MG1 is executed (VC1, step #06). In the second voltage control process, the AC voltage command values Vu, Vv, and Vw are determined and, further, the switching control signals Pu, Nu, Pv, Nv, Pw, and Nw for the inverter 6 are generated on the basis of the modulation rate M, the voltage command phase qv, and the magnetic pole position q.

Thereafter, the magnetic pole position q of the second electric motor MG2 temporarily stored in the analog memory is converted into digital data by the A/D converter 67 and is taken in (PT2, step #07). Next, the second voltage control process for the second electric motor MG2 is executed (VC2, step #08). As the modulation rate M and the voltage command phase qv used in the second voltage control process (VC2) for the second electric motor MG2, those derived in the first voltage control process (MC2) for the second electric motor MG2 executed one computation cycle earlier (for example, in the first computation cycle T12 with respect to the first computation cycle T13 in FIG. 7) are utilized as they are. Thereafter, although not shown in FIGS. 6 and 7, the mode determination process, the carrier frequency determination process, and so forth are executed utilizing an unoccupied time before the first computation cycle T11 elapses. The mode determination process and the carrier frequency determination process may be executed across a plurality of first computation cycles T1 (for example, across the first computation cycles T11 to T13). In the case where such processes are executed across a plurality of first computation cycles T1, the CPU 61 executes interrupt handling each time the first computation cycle T1 elapses to suspend the above processes and to execute the processes from step #01 again. The interim results of the suspended processes are temporarily stored in the work memory 65 or the like.

On the other hand, if it is determined that the current number of times of executing the first computation cycle T1 is not an odd number, that is, is an even number (step #02: No), the magnetic pole position q and the current detection values Iur, Ivr, and Iwr of the second electric motor MG2 temporarily stored in the analog memory are converted into digital data by the A/D converter 67 and are taken (PT2 IT2, step #13) as shown, for example, in the second first computation cycle T12 in FIG. 7. Next, the current control process for the second electric motor MG2 is executed (IC2, step #14). Next, the first voltage control process for the second electric motor MG2 is executed (MC2, step #15). Next, the second voltage control process for the second electric motor MG2 is executed (VC2, step #16).

Thereafter, the magnetic pole position q of the first electric motor MG1 temporarily stored in the analog memory is converted into digital data by the A/D converter 67 and is taken in (PT1, step #17). Next, the second voltage control process for the first electric motor MG1 is executed (VC1, step #18). As the modulation rate M and the voltage command phase qv used in the second voltage control process (VC1) for the first electric motor MG1, those derived in the first voltage control process (MC1) for the first electric motor MG1 executed one computation cycle earlier (for example, in the first computation cycle T11 with respect to the first computation cycle T12 in FIG. 7) are utilized as they are. Thereafter, in the same way as described above, the mode determination process, the carrier frequency determination process, and so forth are executed utilizing an unoccupied time before the first computation cycle T1 elapses. As a matter of course, the setting can be appropriately changed such that which of the motors MG the current control process and the first voltage control process are performed for in an even numbered execution or in an odd numbered execution.

By executing the electric motor control process as described above, the second voltage control process (VC1) for the first electric motor MG1 and the second voltage control process (VC2) for the second electric motor MG2 are executed once each in each of the first computation cycles T1 (T11 to T14, each of which is equal to the reference computation cycle T0). In the second voltage control process (VC2), as described above, the switching control signals Pu, Nu, Pv, Nv, Pw, and Nw for the second voltage control section 23 to control the inverter 6 are generated on the basis of the modulation rate M, the voltage command phase qv, and the magnetic pole position q. Thus, in the embodiment, the second voltage control sections 23 corresponding to the electric motors MG1 and MG2 respectively complete the process for generating the switching control signals Pu, Nu, Pv, Nv, Pw, and Nw corresponding to the electric motors MG1 and MG2 in each reference computation cycle T0.

Meanwhile, the first voltage control section 22 corresponding to the first electric motor MG1 executes the first voltage control process (MC1) for the first electric motor MG1 once in each second computation cycle T2 (which is equal to twice the reference computation cycle T0) in FIG. 7. More specifically, the first voltage control section 22 corresponding to the first electric motor MG1 completes the first voltage control process (MC1) in which the modulation rate M and the voltage command phase qv of the first electric motor MG1 are derived once in every two reference computation cycles T0, but does not execute the first voltage control process (MC1) in the other reference computation cycle T0. Likewise, the first voltage control section 22 corresponding to the second electric motor MG2 executes the first voltage control process (MC2) for the second electric motor MG2 once in each second computation cycle T2. More specifically, the first voltage control section 22 corresponding to the second electric motor MG2 completes the first voltage control process (MC2) in which the modulation rate M and the voltage command phase qv of the second electric motor MG2 are derived in one of every two reference computation cycles T0, but does not execute the first voltage control process (MC2) in the other of every two reference computation cycles T0. In this event, the second computation cycle T2 (the second computation cycles T21 and T23 in FIG. 7) in which the first voltage control section 22 corresponding to the first electric motor MG1 executes the first voltage control process (MC1) and the second computation cycle T2 (the second computation cycles T22 and T24 in FIG. 7) in which the first voltage control section 22 corresponding to the second electric motor MG2 executes the first voltage control process (MC2) are shifted from each other by half a cycle (which is equal to the reference computation cycle T0). This allows the first voltage control process (MC1) for the first electric motor MG1 and the first voltage control process (MC2) for the second electric motor MG2 to be executed alternately in different reference computation cycles T0.

Thus, in the embodiment, the first voltage control section 22 corresponding to the first electric motor MG1 completes the first voltage control process (MC1) for the first electric motor MG1 once in every two reference computation cycles T0, and the first voltage control section 22 corresponding to the second electric motor MG2 completes the first voltage control process (MC2) for the second electric motor MG2 in the other reference computation cycle T0 in which the first voltage control process (MC1) for the first electric motor MG1 is not executed. According to such an electric motor control process, the second voltage control processes (VC1 and VC2) corresponding to the electric motors MG1 and MG2 are executed once in each reference computation cycle T0 to generate the switching control signals Pu, Nu, Pv, Nv, Pw, and Nw. Thus, the two electric motors MG1 and MG2 can be driven smoothly. The first voltage control processes (MC1 and MC2) corresponding to the electric motors MG1 and MG2 are executed alternately once in every two reference computation cycles T0 to derive the modulation rate M and the voltage command phase qv sequentially for the two electric motors MG1 and MG2. Hence, the modulation rate M and the voltage command phase qv for each of the electric motors MG1 and MG2 can be updated in an appropriate cycle to appropriately perform the second voltage control processes (VC1 and VC2) for the electric motors MG1 and MG2. Thus, the two electric motors MG1 and MG2 can be controlled appropriately in an optimum computation cycle using the single CPU core 62.

In this event, in the embodiment, a sequence of voltage control processes in which the switching control signals Pu, Nu, Pv, Nv, Pw, and Nw are generated on the basis of the d-axis voltage command value Vd, the q-axis voltage command value Vq, and the magnetic pole position q, which has been collectively performed in one computation cycle (in the first computation cycle T1 in the example) in the related art, is divided into the first voltage control process and the second voltage control process. As described above, the first voltage control process is a computation process in which the modulation rate M and the voltage command phase qv are derived on the basis of the d-axis voltage command value Vd, the q-axis voltage command value Vq, and the DC voltage Vdc. Also, the second voltage control process is a computation process in which the switching control signals Pu, Nu, Pv, Nv, Pw, and Nw are generated on the basis of the modulation rate M and the voltage command phase qv derived in the first voltage control process and the magnetic pole position q. In the embodiment, the first voltage control process is executed once in every two reference computation cycles T0 to match the third computation cycle T3 (=twice the reference computation cycle T0) of the current control process performed by the current control section 13 and the update cycle (=twice the reference computation cycle T0) of the current detection values Idr and Iqr. Hence, the processing load by the CPU core 62 is reduced compared to a case where the entire sequence of voltage control processes is executed once in each reference computation cycle T0 as in the related art. Meanwhile, the second voltage control process is executed once in each reference computation cycle T0. Thus, the electric motors MG can be controlled appropriately by generating and outputting the switching control signals Pu, Nu, Pv, Nv, Pw, and Nw in accordance with the magnetic pole position q, which varies constantly, once in each reference computation cycle T0. Hence, according to the control device 2 for the electric motor drive device 1 of the present invention, the electric motors MG can be controlled appropriately to drive the electric motors MG smoothly while reducing the processing load on the CPU core 62.

2. Second Embodiment

The control device 2 for the electric motor drive device 1 according to a second embodiment of the present invention will be described. Also in the embodiment, the electric motor drive device 1 is configured as a device that controls driving of an interior permanent magnet synchronous electric motor MG which is an AC electric motor that operates on three-phase AC. The hardware configuration of the electric motor drive device 1 and the control device 2, the software configuration of the control device 2, and the relationship between the computation cycles of the respective functional sections of the control device 2 according to the embodiment are the same as those in the above first embodiment. The second embodiment is different from the above first embodiment in that only one electric motor MG is provided to be controlled by the electric motor drive device 1, although not shown. Accordingly, procedures of the electric motor control process are partly different from those in the above first embodiment. Procedures of the electric motor control process according to the second embodiment, which are the main difference from the above first embodiment, will be described below.

2-1. Procedures of Electric Motor Control Process

Figure 8:
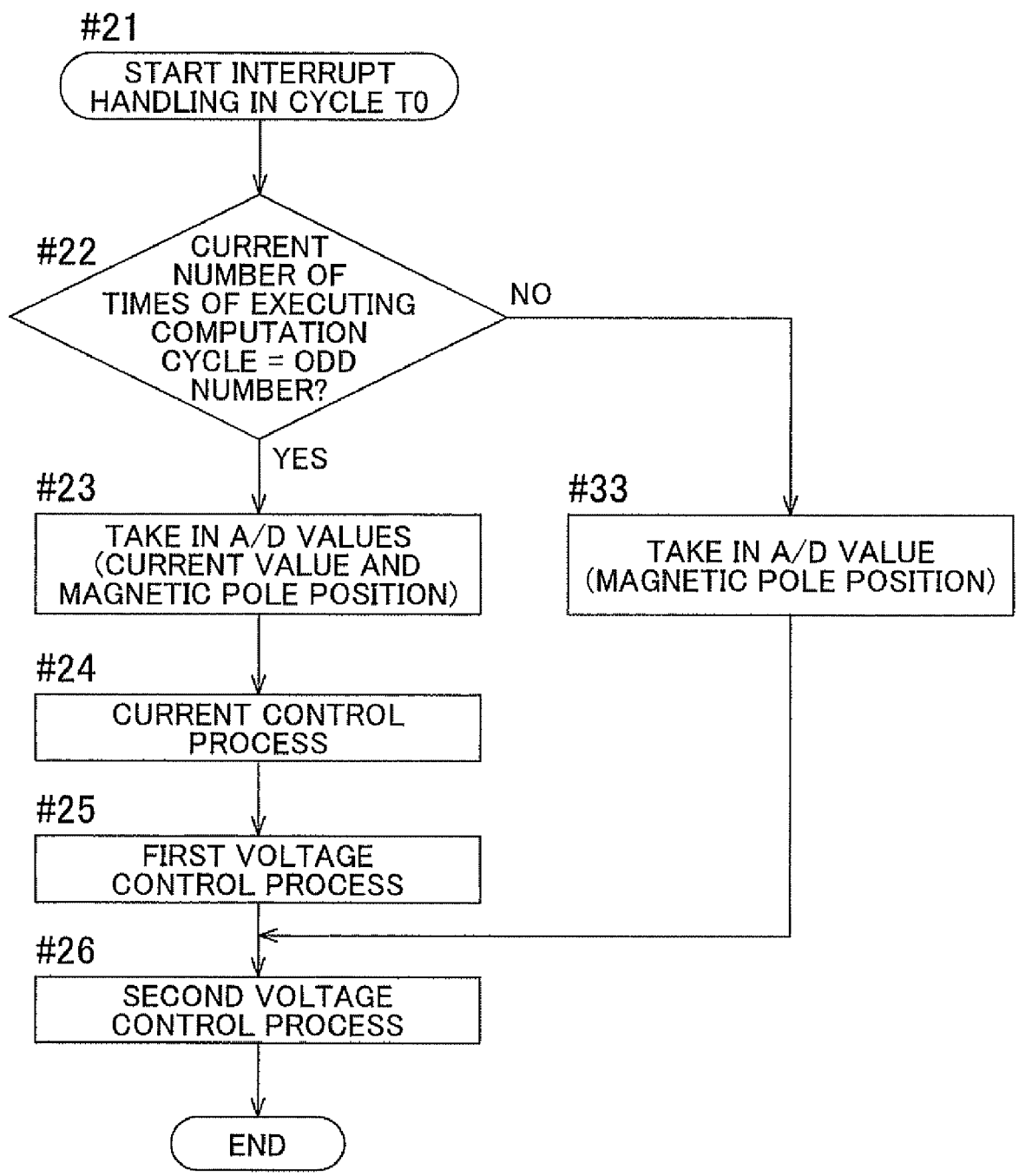
FIG. 8 is a flowchart showing process procedures of an electric motor control process according to a second embodiment.
Figure 9:
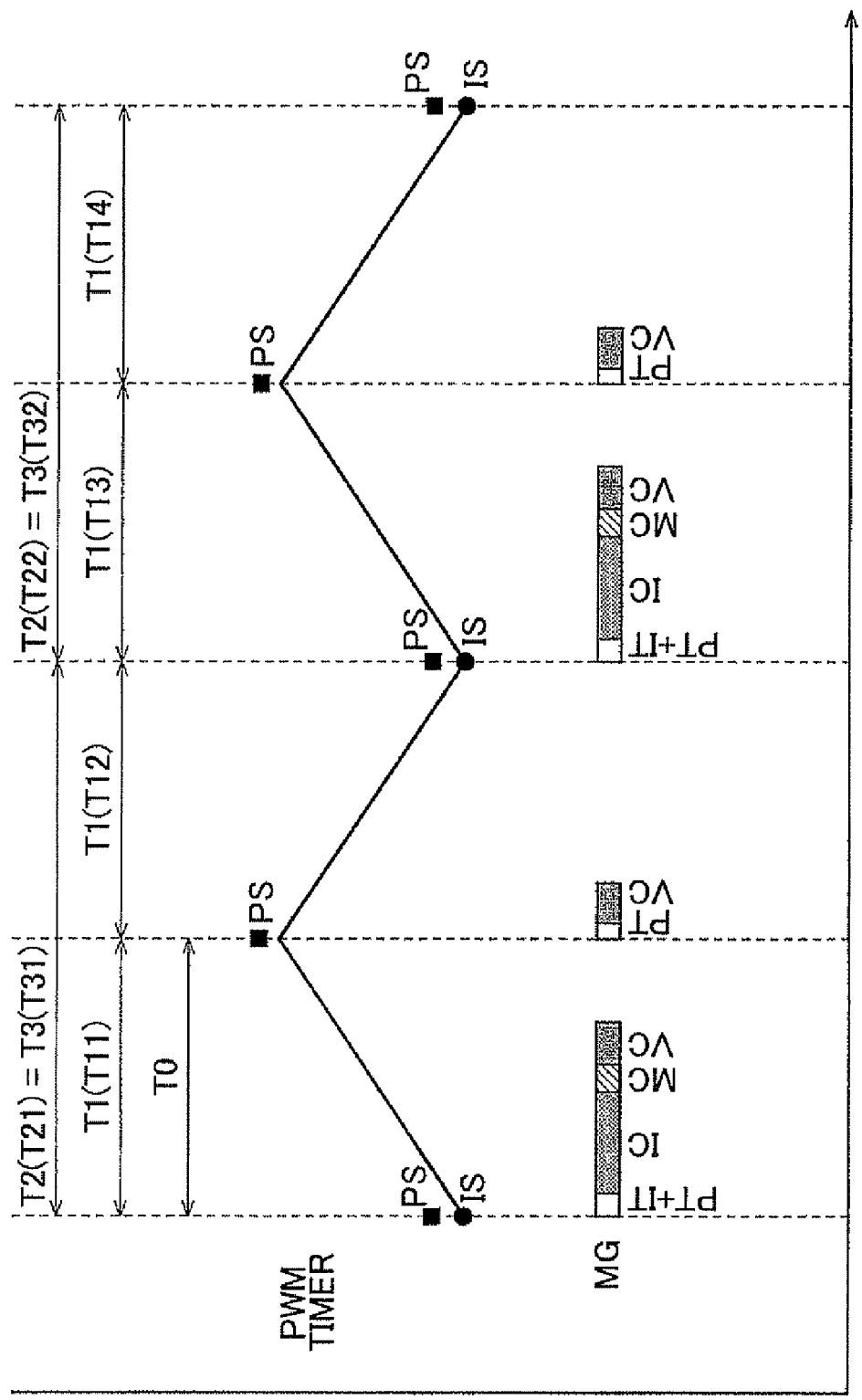
FIG. 9 is a time chart of a case where the electric motor control process according to the second embodiment is performed.

Procedures of the electric motor control process according to the embodiment will be described with reference to the flowchart of FIG. 8 and the time chart of FIG. 9. In the electric motor control process according to the second embodiment, as shown in FIG. 9, magnetic pole position sampling (PS) for the electric motor MG is executed in each reference computation cycle T0 which is the cycle of interrupt handling performed by the CPU 61. The reference computation cycle T0 is equal to the first computation cycle T1 of the second voltage control process. Also, current value sampling (IS) for the electric motor MG is executed in each cycle corresponding to twice the reference computation cycle T0. The cycle corresponding to twice the reference computation cycle T0 is equal to the second computation cycle T2 of the first voltage control process. The sampling results are temporarily stored in an analog memory (not shown) or the like.

When interrupt handling is executed by the CPU 61 (step #21), it is first determined whether or not the number of executing the first computation cycle T1 (=reference computation cycle T0) is an odd number (step #22). If it is determined that the current number of times of executing the first computation cycle T1 is an odd number (step #22: Yes), the magnetic pole position q and the current detection values Iur, Ivr, and Iwr of the electric motor MG temporarily stored in the analog memory are converted into digital data by the A/D converter 67 (see FIG. 1) and are taken in (PT+IT, step #23) as shown, for example, in the first computation cycle T11 executed first time as shown in FIG. 9. Next, the current control process is executed (IC, step #24). Next, the first voltage control process is executed (MC, step #25). Next, the second voltage control process is executed (VC, step #26). Thereafter, although not shown in FIGS. 6 and 7, the mode determination process, the carrier frequency determination process, and so forth are executed utilizing an unoccupied time before the first computation cycle T11 elapses. In this respect, the embodiment is the same as the above first embodiment.

On the other hand, if it is determined that the current number of times of executing the first computation cycle T1 is not an odd number, that is, is an even number (step #22: No), only the magnetic pole position q of the electric motor MG temporarily stored in the analog memory is converted into digital data by the A/D converter 67 and is taken in (PT, step #33) as shown, for example, in the second first computation cycle T12 in FIG. 9. Next, the second voltage control process is executed (VC, step #26). As the modulation rate M and the voltage command phase qv used in the second voltage control process (VC) in T12 which is the computation cycle of an even numbered execution, those derived in the first voltage control process (MC) executed one computation cycle earlier (for example, in the first computation cycle T11 with respect to the first computation cycle T12 in FIG. 7) are utilized as they are. Thereafter, in the same way as described above, the mode determination process, the carrier frequency determination process, and so forth are executed utilizing an unoccupied time before the first computation cycle T1 elapses.

Other Embodiments (1) In the above embodiments, the second computation cycle T2 of the first voltage control process is set to be equal to the third computation cycle T3 of the current control process. However, the present invention is not limited to such embodiments. That is, in one preferred embodiment of the present invention, the second computation cycle T2 of the first voltage control process may be set to be shorter than the third computation cycle T3 of the current control process, or longer than the third computation cycle T3 of the current control process. For example, the second computation cycle T2 of the first voltage control process may be suitably longer than the first computation cycle T1 of the second voltage control process and shorter than the third computation cycle T3 of the current control process. Also in this case, although there is a possibility that unnecessary computation processing is more or less performed, the modulation rate M and the voltage command phase qv for the electric motor MG can be updated in an appropriate cycle while at least reducing the processing load on the CPU core 62.

(2) In the above embodiments, the second computation cycle T2 of the first voltage control process and the third computation cycle T3 of the current control process are equal to each other and are both set to twice the first computation cycle T1 of the second voltage control process. However, the present invention is not limited to such embodiments. That is, the computation cycles T2 and T3 may be suitably set to at least an integer multiple of the first computation cycle T1 of the second voltage control process where the integer is 2 or more. For example, in one preferred embodiment of the present invention, the computation cycles T2 and T3 may be set to three times, four times, etc. of the first computation cycle T1 of the second voltage control process.

(3) In the above embodiments, the second computation cycle T2 of the first voltage control process and the third computation cycle T3 of the current control process are both set to be an integer multiple (here, twice) of the first computation cycle T1 of the second voltage control process. However, the present invention is not limited to such embodiments. That is, in one preferred embodiment of the present invention, the computation cycles T2 and T3 may be longer than the first computation cycle T1 of the second voltage control process and may be not an integer multiple of the first computation cycle T1 of the second voltage control process. For example, regarding the second computation cycle T2 of the first voltage control process, the ratio between the second computation cycle T2 of the first voltage control process and the first computation cycle T1 of the second voltage control process may be set to T2:T1=5:2 or the like. This is also the case with the third computation cycle T3 of the current control process.

(4) In the above embodiments, as the plurality of control modes selectable by the mode determination section 51, three control modes are set, namely the first control mode in which the inverter 6 performs the sinusoidal-wave PWM control along with the maximum torque control, the second control mode in which the inverter 6 performs the overmodulation PWM control along with the maximum torque control, and the third control mode in which the inverter 6 performs the rectangular-wave control along with the field weakening control. However, the present invention is not limited to such embodiments. That is, in one preferred embodiment of the present invention, only two of the control modes listed above may be set, for example. Alternatively, in another preferred embodiment of the present invention, one or more other control modes may be provided so as to be selectable in place of (or in addition to) the above control modes. In this case, the plurality of control modes selectable by the mode determination section 51 may suitably include a control mode realized by combining the sinusoidal-wave PWM control, the overmodulation PWM control, 2-phase modulation PWM control, space vector PWM control, or the like, which are the controls with respect to waveform of the AC voltage supplied from the inverter 6 to the electric motor MG, with the maximum torque control, the field weakening control, field strengthening control, or the like, which are the controls with respect to phase of the AC voltage supplied from the inverter 6 to the electric motor MG.

(5) In the above embodiments, the mode determination section 51 is configured to impose certain limitations on the selection of the control mode on the basis of the d-axis current adjustment command value DId. However, the present invention is not limited to such embodiments. That is, in one preferred embodiment of the present invention, the mode determination section 51 may be configured to freely determine the control mode on the basis of the target torque TM and the rotational speed w with no such limitations imposed. In this case, only the target torque TM and the rotational speed w correspond to the "mode determination input variable" according to the present invention.

(6) In the above embodiments, the mode determination section 51 is configured to determine the control mode on the basis of the target torque TM, the rotational speed w, and the d-axis current adjustment command value DId. However, the present invention is not limited to such embodiments. That is, in one preferred embodiment of the present invention, the mode determination section 51 may be configured to determine the control mode on the basis of the rotational speed w and the modulation rate M derived by the first voltage control section 22, for example, as long as at least the control mode is determined appropriately. In this case, the rotational speed w and the modulation rate M correspond to the "mode determination input variable" according to the present invention.

(7) In the above embodiments, the carrier frequency determination section 52 is configured to determine the carrier frequency Fc on the basis of the modulation rate M and the rotational speed w. However, the present invention is not limited to such embodiments. That is, in one preferred embodiment of the present invention, the carrier frequency determination section 52 may be configured to determine the carrier frequency Fc on the basis of the target torque TM and the rotational speed w, for example, as long as at least the carrier frequency Fc is determined appropriately. In this case, the target torque TM and the rotational speed w correspond to the "carrier frequency determination input variable" according to the present invention.

(8) In the above embodiments, the reference computation cycle T0 is set to 300 [ms], the update cycles of the respective input variables are set as shown in Table 1, and the computation cycles of the respective computation processes are set as shown in Table 2. However, the present invention is not limited to such embodiments. That is, these set values are merely exemplary, and may be modified appropriately. In this case, the relationship between the update cycles of the respective input variables and the computation cycles of the respective computation processes should be determined in accordance with the technical idea described in relation to the above embodiments.

(9) In the above first embodiment, the electric motor drive device 1 includes the two electric motors MG1 and MG2 to be controlled and the two inverters 6a and 6b respectively corresponding to the two electric motors MG1 and MG2, and the control device 2 is configured to control the two electric motors MG1 and MG2 by controlling the two inverters 6a and 6b. In this case, in addition, the two electric motors MG1 and MG2 are controlled using the single CPU core 62. Meanwhile, in the above second embodiment, only one electric motor MG to be controlled by the electric motor drive device 1 is provided. However, the present invention is not limited to such embodiments. That is, in one preferred embodiment of the present invention, the electric motor drive device 1 may include N electric motors MG to be controlled and N inverters 6 respectively corresponding to the N electric motors MG where N is an integer of 3 or more, and the control device 2 may be configured to control the N electric motors MG by controlling the N inverters 6, for example.

Also in this case, the electric motor drive device 1 which controls the N electric motors MG may be suitably controlled using the single CPU core 62. In this case, such a configuration can be realized appropriately by setting the second computation cycle T2 of the first voltage control process to N times or more the first computation cycle T1 of the second voltage control process. That is, by adopting such frequency setting as described above, it is possible to appropriately realize a configuration in which the respective second voltage control sections 23 corresponding to the N electric motors MG complete a process for generating the switching control signals Pu, Nu, Pv, Nv, Pw, and Nw respectively corresponding to the electric motors MG in each first computation cycle T1, and in which the respective first voltage control sections 22 corresponding to the N electric motors MG sequentially complete the first voltage control process for the corresponding electric motors MG once in every N first computation cycles T1.

(10) In the above embodiments, the present invention is applied to the control device 2 for the electric motor drive device 1 which controls the electric motor MG used as a drive power source for electric vehicles, hybrid vehicles, or the like. However, the application range of the present invention is not limited thereto. That is, the present invention may be applied for controlling various apparatuses and devices that control an AC electric motor.

According to the present invention, an electric motor drive device including a DC/AC conversion section that converts a DC voltage into an AC voltage to supply the AC voltage to an AC electric motor can be suitably controlled by a control device using a vector control method.

What is claimed is:

1. A control device that controls an electric motor drive device, which controls a DC/AC conversion section that converts a DC voltage into an AC voltage to supply the AC voltage to an AC electric motor using a vector control method, the control device comprising:
a voltage control section that generates three-phase voltage command values from two-phase voltage command values and that generates a switching control signal configured to drive the AC electric motor, wherein
a first voltage control section that derives a modulation rate representing a ratio of an effective value of the two-phase voltage command values to an actual DC voltage supplied to the DC/AC conversion section and a voltage command phase which is a phase angle between voltage vectors represented by the two-phase voltage command values,
a second voltage control section that generates the three-phase voltage command values based on the modulation rate, the voltage command phase, and a magnetic pole position detecting a rotational angle of a rotator of the AC electric motor and that generates the switching control signal configured to drive the AC electric motor based on the three-phase voltage command values, and
a computation cycle of the first voltage control section is set to be longer than a computation cycle of the second voltage control section.

2. The control device for an electric motor drive device according to claim 1, further comprising:
a current control section that derives the two-phase voltage command values on the basis of current command values which are command values of currents for two phases for driving the AC electric motor, actual currents flowing through the AC electric motor, and a rotational speed of the rotator, wherein
the computation cycle of the first voltage control section is set to be equal to a computation cycle of the current control section.

3. The control device for an electric motor drive device according to claim 2, wherein
the computation cycle of the current control section and the first voltage control section is set to N times the computation cycle of the second voltage control section (N is an integer of 2 or more).

4. The control device for an electric motor drive device according to claim 3, further comprising:
a mode determination section that determines one of a plurality of control modes set in advance to control the electric motor drive device on the basis of a predetermined mode determination input variable,
wherein the second voltage control section generates the three-phase voltage command values in accordance with the control mode determined by the mode determination section, and
an update cycle of the mode determination input variable is set to be longer than the computation cycle of the first voltage control section, and a computation cycle of the mode determination section is set to be equal to the update cycle of the mode determination input variable.

5. The control device for an electric motor drive device according to claim 4, further comprising:
a carrier frequency determination section that determines a carrier frequency of the DC/AC conversion section on the basis of a predetermined carrier frequency determination input variable, wherein
an update cycle of the carrier frequency determination input variable is set to be longer than the computation cycle of the first voltage control section, and a computation cycle of the carrier frequency determination section is set to be equal to the update cycle of the carrier frequency input variable.

6. The control device for an electric motor drive device according to claim 5, wherein
the computation cycle of the first voltage control section is set to N times the computation cycle of the second voltage control section (N is an integer of 2 or more), and the electric motor drive device is configured to control N AC electric motors and to be controlled using a single computation processing unit,
the second voltage control section completes a generation process for generating the three-phase voltage command values corresponding to each of the AC electric motors in each reference computation cycle set to a predetermined time, and
the first voltage control section completes a derivation process for deriving the modulation rate and the voltage command phase for one of the N AC electric motors once in N reference computation cycles, and completes the derivation process for the other AC electric motors once in the N reference computation cycles while the derivation process for the one of the AC electric motors is not executed.

7. The control device for an electric motor drive device according to claim 1, further comprising:
   a mode determination section that determines one of a plurality of control modes set in advance to control the electric motor drive device on the basis of a predetermined mode determination input variable,
   wherein the second voltage control section generates the three-phase voltage command values in accordance with the control mode determined by the mode determination section, and
   an update cycle of the mode determination input variable is set to be longer than the computation cycle of the first voltage control section, and a computation cycle of the mode determination section is set to be equal to the update cycle of the mode determination input variable.

8. The control device for an electric motor drive device according to claim 1, further comprising:
   a carrier frequency determination section that determines a carrier frequency of the DC/AC conversion section on the basis of a predetermined carrier frequency determination input variable, wherein
   an update cycle of the carrier frequency determination input variable is set to be longer than the computation cycle of the first voltage control section, and a computation cycle of the carrier frequency determination section is set to be equal to the update cycle of the carrier frequency input variable.

9. The control device for an electric motor drive device according to claim 1, wherein
   the computation cycle of the first voltage control section is set to N times the computation cycle of the second voltage control section (N is an integer of 2 or more), and the electric motor drive device is configured to control N AC electric motors and to be controlled using a single computation processing unit,
   the second voltage control section completes a generation process for generating the three-phase voltage command values corresponding to each of the AC electric motors in each reference computation cycle set to a predetermined time, and
   the first voltage control section completes a derivation process for deriving the modulation rate and the voltage command phase for one of the N AC electric motors once in N reference computation cycles, and completes the derivation process for the other AC electric motors once in the N reference computation cycles while the derivation process for the one of the AC electric motors is not executed.

* * * * *